(12) United States Patent
Esfhani et al.

(10) Patent No.: US 10,346,792 B2
(45) Date of Patent: Jul. 9, 2019

(54) SYSTEM AND METHOD FOR CONTROL OF BAILMENT INVENTORY

(71) Applicant: CHEXOLOGY, LLC, Great Neck, NY (US)

(72) Inventors: David Esfhani, Great Neck, NY (US); Kiumarz Geula, Great Neck, NY (US); Derek Pacque, Indianapolis, IN (US)

(73) Assignee: Chexology, LLC, New York, NY (US)

( * ) Notice: Subject to any disclaimer, the term of this patent is extended or adjusted under 35 U.S.C. 154(b) by 450 days.

(21) Appl. No.: 14/711,594

(22) Filed: May 13, 2015

(65) Prior Publication Data
US 2015/0332211 A1   Nov. 19, 2015

Related U.S. Application Data

(60) Provisional application No. 61/992,810, filed on May 13, 2014.

(51) Int. Cl.
*G06Q 10/00* (2012.01)
*H04M 3/00* (2006.01)
*G06Q 10/08* (2012.01)

(52) U.S. Cl.
CPC ................. *G06Q 10/087* (2013.01)

(58) Field of Classification Search
USPC ............................................. 705/28; 455/418
See application file for complete search history.

(56) References Cited

U.S. PATENT DOCUMENTS 7,860,491 B2 * 12/2010 Reich .................... H04L 67/104
370/216
8,985,440 B2   3/2015 Pacque
(Continued)

FOREIGN PATENT DOCUMENTS

JP   2010023952 A * 2/2010

OTHER PUBLICATIONS

PCT Search Report for WO2015175709, dated Jun. 25, 2015.
European patent application office action, dated Jun. 28, 2017.

*Primary Examiner* — Ariel J Yu
(74) *Attorney, Agent, or Firm* — Payam Moradian

(57) ABSTRACT

Provided is a system and method for control of bailment inventory is disclosed. The method includes receiving a customer identifier and a bailment item from the customer. A digital identification device is stored with the bailment item. Subsequently, during check-out, the customer identifier is received for a second time and a signal is sent to the digital identification device causing it to alert the attendant, allowing the bailment items to be retrieved. Also provided is a method for control of bailment inventory, comprising the steps of: receiving a customer identifier for a first time from a customer, the customer identifier received for the first time on any of two or more input devices configured to receive the customer identifier, receiving from the customer at least one customer item for bailment; associating the customer identifier with a digital identification device; optionally attaching the digital identification device directly or indirectly to the bailment item; storing the bailment item with the attached digital identification device; receiving the customer identifier from the customer for a second time, the customer identifier received for the second time capable of being received on any of the two or more input devices; sending a signal to the digital identification device (DID) to cause an action that draws attention to the digital identification device; and retrieving the bailment item, wherein receiving the customer identifier for the first time and the second time can be with same or different of the two or more input devices.

44 Claims, 24 Drawing Sheets

(56) References Cited

U.S. PATENT DOCUMENTS

| | | | |
|---|---|---|---|
| 9,621,659 B1* | 4/2017 | Ghazanfari | H04L 67/18 |
| 2007/0057817 A1* | 3/2007 | Aman | G08G 1/14 |
| | | | 340/933 |
| 2012/0096121 A1* | 4/2012 | Hao | H04L 67/2842 |
| | | | 709/219 |
| 2014/0348384 A1* | 11/2014 | Kolehmainen | G06Q 10/087 |
| | | | 382/103 |
| 2015/0288804 A1* | 10/2015 | Kadous | H04M 1/72577 |
| | | | 455/418 |
| 2015/0312331 A1* | 10/2015 | Crocker | H04L 63/061 |
| | | | 709/205 |

* cited by examiner

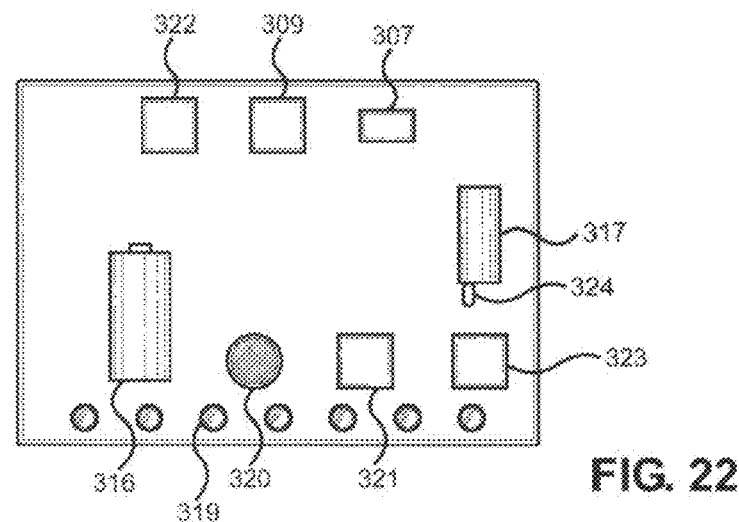
FIG. 22
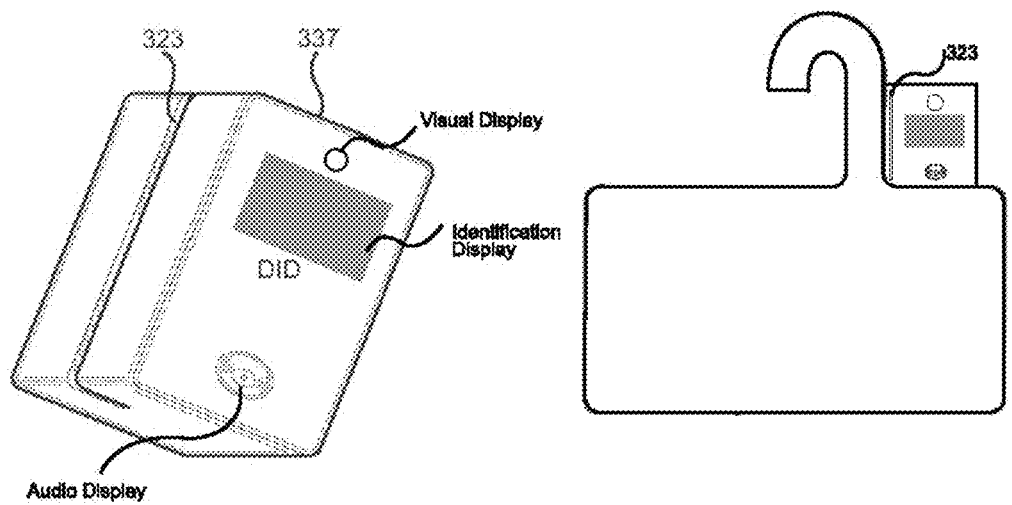
FIG. 23
FIG. 24

SYSTEM AND METHOD FOR CONTROL OF BAILMENT INVENTORY

CROSS-REFERENCE

The present application claims the benefit of U.S. Provisional Appl. No. 61/992,810, filed on May 13, 2014, which is incorporated herein by reference in its entirety.

BACKGROUND SECTION OF THE INVENTION

Bailment describes a legal relationship in common law where physical possession of personal property, or chattel, is transferred from one person (the 'bailor') to another person (the 'bailee') who subsequently has possession of the property. The disclosure herein relates to controlling inventory in any bailment situation, where one party is entrusting temporary custody of that party's personal property to another party for safekeeping. Bailment arises in a wide variety of situations, including valet parking, dry cleaning, warehousing and carriage of goods, to name just a few non-limiting examples.

It is known in the art to provide a service, either for a charge or gratuitously, whereby a person entering a business may check their coat for safekeeping while they are on the premises of the business. The guest is generally given some form of token or ticket to identify which coat belongs to them, and the guest may retrieve the coat when they are ready to leave. Such services are popular because many guests do not want to bother with keeping track of their coat while they are on the premises. Providing a coat check attracts more customers to a business and enhances the customer experience while they are on the premises. While the concept of checking coats may seem straightforward, anyone running such a service quickly comes up against a number of well-known problems. Here are some of the more persistent challenges:

Lost Coats.

The liability associated with checking coats is a large risk for a business providing a coat check. The expense of garment replacement, and the harm to the reputation of the business that come with losing a customer's coat, are potentially large. The expense of replacing a coat will often exceed the profit earned from the customer's visit by many multiples.

Lost Tickets.

Traditional coat check services give customers a ticket or other token for their checked coat. It is not uncommon for customers, particularly those at bars or nightclubs, to then lose those tickets. This leads to customer frustration and longer check-out times while attempting to match the customer to their coat.

Unclaimed Coats.

Coat check services in bars and nightclubs commonly wind up with a number of unclaimed coats at night's end. The establishment must then decide if they will deal with hanging on to the garments or trying to return them, or throw them out. Each answer presents its own set of drawbacks.

Check-In Time.

Customers do not want a coat checking process that slows them down unduly, and business owners do not want customers spending time at the coat check station when they could be making purchases. For some businesses, the crush of patrons all needing their coats at closing time also is a daunting prospect.

Locating a Coat.

Just as customers do not want to stand in a long, slow line to check their coats, they also want the check-out process to be quick and efficient. When hundreds of coats are checked over the course of one night, the logistics of finding a particular coat can be a challenge, and errors in hanging the coat are possible. When a customer loses his bailment ticket, then there is usually no way to confirm which coat belongs to the customer.

Slow Process

The bailment process can be slow. In a large venue, customers typically check-in and check-out their coats at the same time. Typically, it takes time to locate a coat after a customer gives a ticket to an attendant. Additionally, there may not be enough attendants to service all of the customers and retrieve their coats.

Similar issues arise in almost any bailment situation. It will be appreciated then that there remains a need in the art for improvements in existing systems and methods of controlling bailment inventory. The present invention is directed to satisfying this need.

SUMMARY SECTION OF THE INVENTION

Provided is a method for control of bailment inventory, comprising the steps of: receiving a customer identifier for a first time from a customer, the customer identifier received for the first time on any of two or more input devices configured to receive the customer identifier, receiving from the customer at least one customer item for bailment; associating the customer identifier with a digital identification device; optionally attaching the digital identification device directly or indirectly to the bailment item; storing the bailment item with the attached digital identification device; receiving the customer identifier from the customer for a second time, the customer identifier received for the second time capable of being received on any of the two or more input devices; sending a signal to the digital identification device (DID) to cause an action that draws attention to the digital identification device; and retrieving the bailment item, wherein receiving the customer identifier for the first time and the second time can be with same or different of the two or more input devices.

The method can further comprise a network configured to allow the two or more input devices to communicate with each other. The network can be a peer-to-peer network. The network can be turned-off as a default when a communication with a server through internet is established. The network can be WiFi direct or Bluetooth. The method can comprise a communication network and a server, wherein the input devices are configured to communicate with the server over the communication network, and the server is configured to update the input devices. The step of associating further comprises the input device receiving a unique code directly or indirectly associated with the DID. The step of associating can be carried out through coupling at a distance of less than one meter. The step of associating can further comprise configuring the input devices to communicate with NFC (Near Field Communication). The step of associating can comprise coupling the input device configured to communicate with the NFC with the DID or an object that is stored with the bailment item and is configured to communicate with the NFC at a distance of less than one meter. The input device can communicate with the DID through radio frequencies. The action that draws attention can be selected from the group consisting of at least one of: a visual signal, an audio signal, an audiovisual signal, and a vibration. The digital identification device can transmit a signal that includes a geographic-positioning location information, such as GPS or geolocation. The customer identifier can be selected from the group consisting of at least one of a phone number, an identification number, a biometric fingerprint, facial recognition, a credit card having a chip, a credit card having a magnetic strip, a barcode, a mobile application-generated barcode, and a mobile payment identification. The digital identification device can be in the form of a module that is attached to a complementary unit, the complementary unit configured to attach to or hold a bailment item. In absence of a connection to a server, communication is carried out with a local master or the input devices communication with each other peer-to-peer. The method can be carried out in the absence of an internet connection to a server. The input device can be a tablet computer. The bailment item can be a coat. The bailment item can be selected from the group consisting of: a coat, clothing, an automobile, a suitcase, a bag, electronics, a camera, a ski, sports equipment, a computer, a boat, a tablet computer, a mobile phone, a motorcycle, jewelry, gold, money, valuable chattel, toys, headphones, roller skates, and a bicycle. Some of the steps can be carried out by an attendant. The method can be carried out by the input device receiving a customer identifier, optionally communicating the customer identifier to a server for a first time, associating by the input device the DID with the customer, communicating by the input device with the server for a second time, and the server updating a database and all of the input devices. The method can be carried out by the input device receiving a customer identifier, optionally communicating the customer identifier to a server for a first time, retrieving the DID for the customer, transmitting a radio signal to the DID, closing transaction with the customer, communicating with the server for a second time, and the server updating a database and all the input devices. The associating step can be carried out with NFC and sending the signal to the DID is carried out with RFID. The input devices can be configured to communicate with a cloud based server with WiFi, and in event of a failure of WiFi, to communicate to the server through a cellular network, and in event of failure of both WiFi and the cellular network, to operate without the cloud based server. The bailment item can be a coat, and the coat is placed on a hanger, the hanger configured to communicate with the input devices. The bailment item can be a coat, and the coat is placed on a hanger, the DID attached to the hanger, and either of the DID or the hanger configured to communicate with the input devices.

Provided is a computer-implemented bailment system comprising: a plurality of digital identification devices (DID) configured to be associated with a customer identifier, and adapted to be stored with a bailment item; b. two or more input devices configured to receive the customer identifier and to transmit a signal to the digital identification devices; c. one of: i) a server/client configuration where a server communicates with the input devices over a communication network and updates the input devices on status of the customer, ii) a master/slave configuration where a local master updates the input devices, iii) a peer-to-peer configuration among the input devices; wherein the system is configured to receive the customer identifier at check-in and check-out at any one of the plurality of input devices. The system can further comprise a network configured to allow the two or more input devices to communicate with each other. The network can be a peer-to-peer network. The network can be disabled as a default when a communication with the server is established. The network can be WiFi direct or Bluetooth. The network can further comprise a communication network that is configured to allow the server to communicate with the input devices. The input devices and the digital identification devices can be configured to be coupled with each other through communication by NFC, the communication with the NFC resulting in the digital identification devices being associated with the customer identifier. The step of associating can be carried out through coupling at a distance of less than one meter. The input devices can be configured to communicate with the digital identification devices through radio frequencies. The digital identification devices can be configured to emit one or more of a visual signal, an audio signal, an audiovisual signal, and a vibration. The digital identification devices can be configured to transmit a signal that includes a geographic-positioning location information, such as GPS or geolocation. The digital identification devices can be in form of a module that is attached to a complementary unit, the complementary unit configured to attach to a bailment item. The system can be configured to function in the absence of a connection to the server. The input device can be a tablet computer. The system can be configured to receive the customer identifier, optionally communicating the customer identifier to the server for a first time, associating the DID with the customer, communicating by the input devices with the server for a second time, and updating by the server a database and all of the input devices. The system can be configured to receive the customer identifier, optionally communicating by the input devices the customer identifier to the server, retrieving the DID for the customer, transmitting a radio signal to the DID, closing transaction by the input devices with the customer, communicating by the input devices with the server, and the server updating a database and all the input devices. The input devices can be configured to communicate with a cloud based server with WiFi, and in event of a failure of WiFi, to communicate to the server through a cellular network, and in event of failure of both WiFi and the cellular network, to operate without the cloud based server.

The bailment item can be a coat, and the coat is placed on a hanger, the hanger is configured to communicate with the input devices. The bailment item can be a coat, and the coat is placed on a hanger, the DID attached to the hanger, and either of the DID or the hanger is configured to communicate with the input devices.

Provided is a method for control of bailment inventory, comprising the steps of: a) activating a digital identification device by coupling at a distance of less than one meter, b) transmitting a radio signal to the digital identification device, the digital identification device configured to emit an audio, visual, or vibration signal upon receiving the radio signal. The coupling can be carried out with NFC.

Provided is a computer implemented method for control of bailment inventory, comprising the steps of: receiving a customer identifier for a first time from a customer, the customer identifier received for the first time on any of two or more input devices configured to receive the customer identifier, associating the customer identifier with a digital identification device; receiving the customer identifier from the customer for a second time, the customer identifier received for the second time capable of being received on any of the two or more input devices; g. and sending a signal to the digital identification device (DID) to cause an action that draws attention to the digital identification device; wherein receiving the customer identifier for the first time and the second time can be with same or different of the two or more input devices.

Provided is a method for control of bailment inventory, comprising the steps of: receiving a customer identifier for a first time from a customer, the customer identifier received for the first time on any of two or more input devices configured to receive the customer identifier, receiving from the customer at least one customer item for bailment; associating the customer identifier with a digital identification device; storing the bailment item with the digital identification device; receiving the customer identifier from the customer for a second time, the customer identifier received for the second time capable of being received on any of the two or more input devices; sending a signal to the digital identification device (DID) to cause an action that draws attention to the digital identification device; and retrieving the bailment item; wherein receiving the customer identifier for the first time and the second time can be with same or different of the two or more input devices.

BRIEF DESCRIPTION OF THE DRAWINGS

FIG. 22 is a diagram displaying the internal components of a Digital Identification device.

FIG. 23 is a diagram displaying the outer casing of a Digital Identification Device.

FIG. 24 is a diagram displaying the Digital Identification Device coupled to a hanger.

DETAILED DESCRIPTION OF THE INVENTION

The present invention provides a method and a system that allows customers to check in an item for bailment at multiple stations and be served by any attendant. During check-out, the same customer can check out from any station. The system is designed to work even in the absence of a connection to an external server or the internet.

Figure 1:
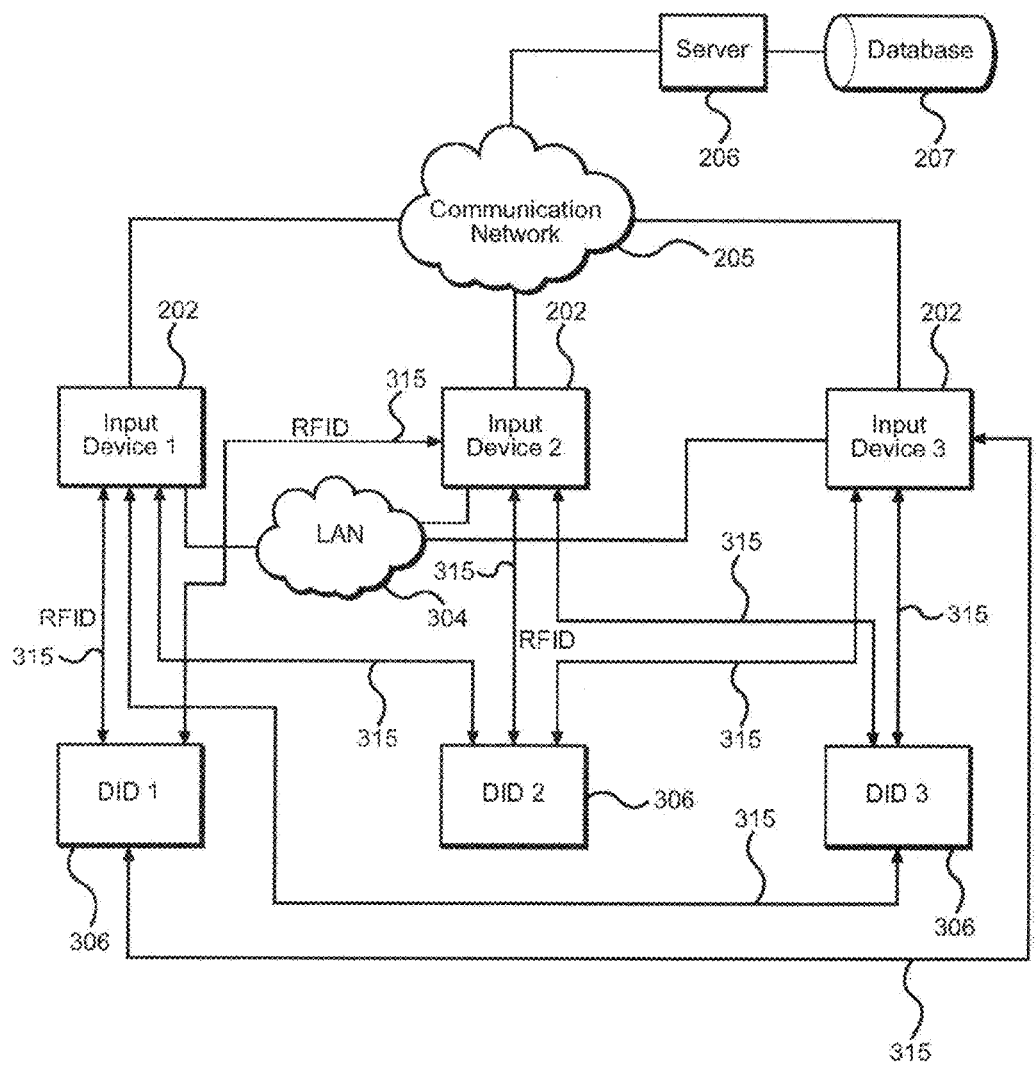
FIG. 1 is a schematic displaying the components of and electronic communications of a bailment system.

Referring now to FIG. 1, a diagram displaying components of a system for a computer-implemented bailment system. As shown in FIG. 1, the system includes a server 206, a database 207, a communication network 205, two or more input devices 202, a communication network 205, a LAN (Local Area Network) 304, and a plurality of digital identification devices 306.

A customer checks-in and checks-out with input device 202. The system has two or more input devices, such as any of two, three, four, five, six, seven, eight, nine, ten, eleven, twelve, thirteen, fourteen, fifteen, sixteen, seventeen, eighteen, nineteen or twenty. Input devices 202 can be added as necessary to make additional stations. Each input device 202 can serve as a station that is serviced by an attendant, or an attendant can service multiple input devices 202.

Figure 25:
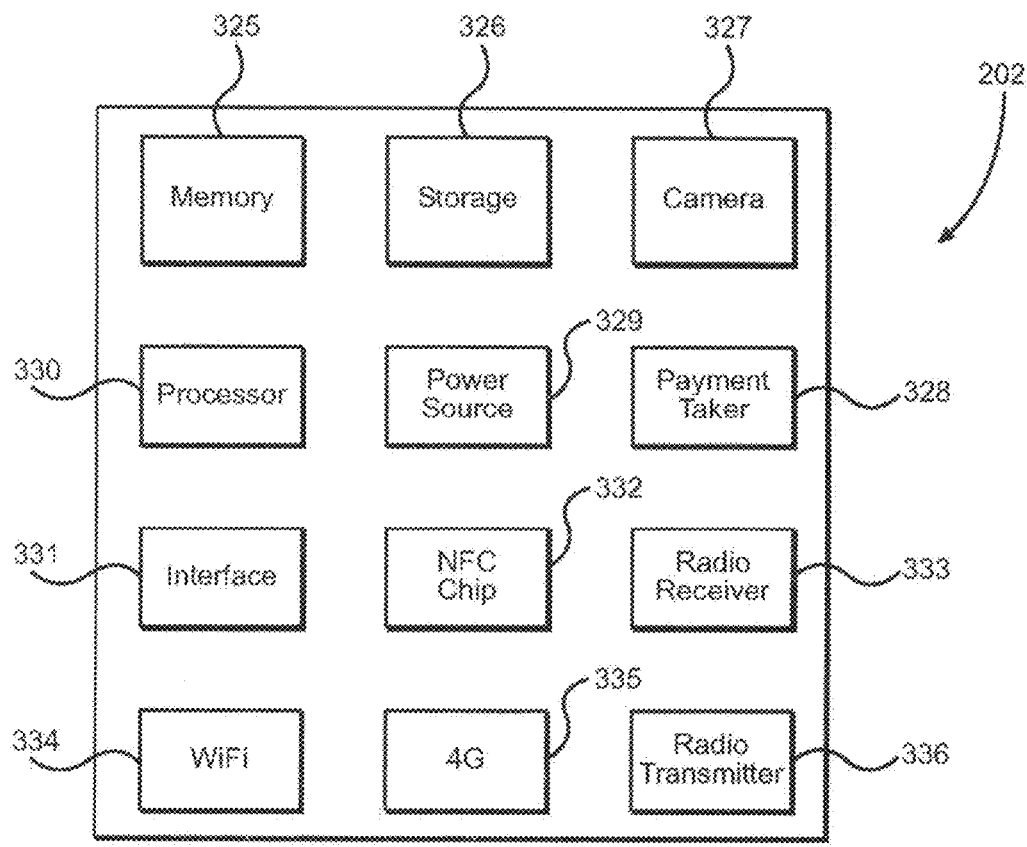
FIG. 25 is a diagram displaying the internal components of an exemplary input device.

In its simplest form, as illustrated in FIG. 25, the input device 202 can be a tablet computer, with a processor 330, a memory 325, and storage 326. Input device 202 can have a user interface, typically in form of a touch screen. Input device 202 can communicate with a network or other devices, such as through an NFC (Near Field Communication) component 332, a WiFi component 334, a Cellular component (i.e. 4G/LTE) 335, a radio transmitter 336, and/or a radio receiver 333. Input device 202 can have a camera 327. Input device 202 can have a power source 329, which can be a battery or a plug for connecting to a source of electricity.

Figure 26:
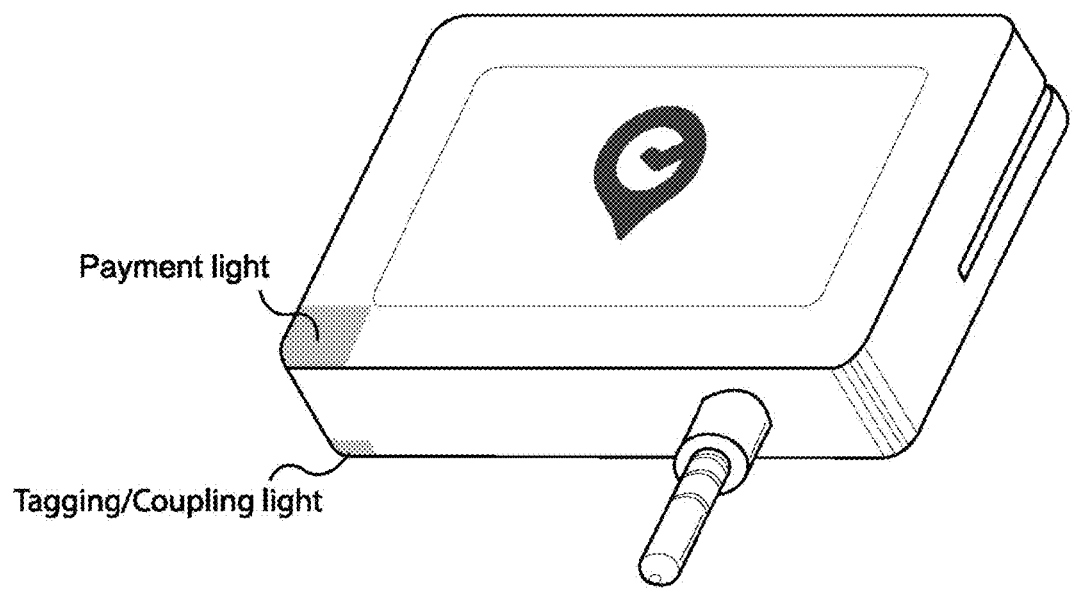
FIG. 26 is a diagram of a plug-in credit card reader.

Input device 202 can have a payment taker 328, which can be a reader of a magnetic strip or a wireless communicator for electronic form of payments. FIG. 26 illustrates a credit card reader than can be electronically coupled to the input device 202. The credit card reader can further have one or more lights for providing a visual signal as to acceptance of a payments and/or successful coupling of the DID 306 with the input device 202. Light goes on as confirmation for successful payment processing through swiping credit card, mobile payments, Apple Pay®, Google Wallet®, NFC payments, EMV (Euroay®, Master Card®, Visa®), and other payment methods. Light goes on as confirmation for successful tagging/coupling of the NFC device.

Light goes on as confirmation for successful tagging. The input device illustrated in FIG. 25 is a tablet computer. The input device 202 can have some or all of the components illustrated in FIG. 25. The input device 202 can also be formed with different components that are in electronic communication with each other, for example, a touch screen monitor that is connected to a separate radio transmitter, and is not limited to a single unitary device.

The input devices 202 can be configured to send and receive data to the server 206 through communication network 205. In such an embodiment, the input device 202 and the server 206 can communicate via communication network 205 over the internet, which can be a WiFi network, a cell tower network (cellular) such as 4G, or a Local Area Network (LAN). Database 207 can contain data on customers that have previously used the system, and based on a customer identification that is entered, can retrieve the customer's account and/or profile. Database 207 can also have the list of the customers at the current event that the system is being used. Server 206 updates this list as customers check-in from various input devices 202.

Server 206 can comprises one or more server towers, computing devices, or systems of a type known in the art. Server 206 can further comprises such software, hardware, and componentry as would occur to one of skill in the art, such as, for example, microprocessors, memory systems, input/output devices, device controllers, display systems, and the like. Server 206 may comprise one of many well-known servers, such as, for example, IBM's AS/400 Server, IBM's AIX UNIX Server, or MICROSOFT's WINDOWS NT Server. The server 206 can be a cloud based server, such as a third party cloud server, that is accessed through the internet.

Server 206 can be connected to database 207. In such an embodiment, Server 206 retrieves data from input device 202, processes the data (ie. By generating business intelligence reports, compressing the data, updating customer list, or otherwise), and stores the data in the database 207. The database 207 can be configured to store data, business intelligence reports, and any information generated through execution of one or more of the steps of one or more of the methods disclosed herein. The database 207 is typically configured to store customer data on bailment at previous events and/or the current event.

The input devices 202 can be in a network with each other, typically a local area network, such as WiFi (wireless Fidelity) direct or Bluetooth, which is configured to allow the input devices 202 to communicate with each other without requiring a wireless access point. Wi-Fi direct is configured to allow peer-to-peer connection that transfers data directly from one input device 202 to another. The communication of input devices 202 through LAN 304 is designed to be a failsafe back-up system. LAN (Local Area Network) 202 can be disabled if the input devices are in communication with server 206. LAN 202 is relied on when the communication with server 206 does not work, for example, when the internet connection with the cloud based server 206 is lost. LAN 304 can also be used for a master/slave relationship when connection with the server is lost. A device, such a mobile phone, a local server, or one of the input devices can act as a master.

The input devices 202 are configured to transmit and optionally receive signals from a digital identification device 306. Additionally, the digital identification devices 306 are configured to receive and optionally send signals to the input devices 315. After receiving a signal 315, typically a signal for retrieving a bailment item, the digital identification device 306 can be configured to emit a visual signal (light), audio signal (sound), or a motion vibration signal. As illustrated in FIG. 1, input device 202 transmits an RFID (Radio Frequency Identification) signal to the DID 306. Any input device 202 can transmit an RFID signal to any DID 306, which allows a customer to check out from any of the input devices 202. Typically, DID 306 is configured for one way communication. After receiving RFID signal, DID 306 typically makes a determination as to whether the signal is meant for that particular DID 306, and light up or makes a sound.

DID 306 is a device that is configured to receive a signal and draw the attention of the attendant, in order to help the attendant in identifying the bailment item. As exemplified in figure DID 306 can have one or more batteries 316, which are typically rechargeable. DID 306 can have a receiver 307, which is typically a radio antenna. The receiver 307 can be configured to receive RFID signals from the input devices 202. DID 306 can have a motor 317 and an off-center weight 324 mechanically coupled to the motor to generate a vibration. DID 306 can have an NFC (Near Field Communication) unit (such as a chip) 323, which is configured to couple with an NFC unit (typically a chip) at the point of check-in to associate a particular DID 306 with the customer identifier. The DID 306 can have a speaker 320 to make a sound. The DID 306 can have a light 319 that may be configured to light up or flash. The DID 306 can have a GPS or geolocation unit 322 to identify the location of the DID 306. The DID 306 can also have a transmitter 309, which for example can communicate the location of the DID as determined by the GPS or geolocation unit 322. The DID 306 can be configured to have any one or combination of a light, speaker, motor, GPS and/or transmitter.

In one embodiment, the NFC unit 323 is placed on a hanger (or other similar objects for holding a bailment item) rather on the DID 306. Each hanger is custom made with an incorporated NFC unit 323, or the NFC unit 323 comes with an adhesive that is put on any hanger. As illustrated in FIG. 24, an NFC chip 323 is inside the DID and the DID is slidably attached to the neck of the hanger. Similarly, in other bailment situations where an object similar to a hanger is used to hold or attach a bailment item, the NFC chip can be placed either on the object or in the DID 306. The DID 306 can be directly attached to the bailment item (such as with a clip or a pin), or indirectly as illustrated in FIG. 24, where the DID 306 is slidably attached to the hanger with slide tracks 324, and the hanger then holds or contacts the bailment item.

As illustrated in FIG. 23, the DID 323 circuit board can be placed in a plastic housing, such as one with at least a transparent portion so that the light from LED (Light emitting Diode) 319 would be visible. The DID 306 can further have a display which is used to display a unique number. The unique number allows the attendant to confirm that the bailment item is the correct bailment item that is being retrieved. DID 306 can be made as a module 337 that can be incorporated into different objects that hold a bailment item. For example, the module 337 can have a slide track 323 that slides into a complementary track 323 on the hanger. If the bailment is a car, the hanger would be designed to complement a track 323 on an object that holds a bailment item, for example a hanger that hangs from the car's mirror behind the windshield.

Figure 2:
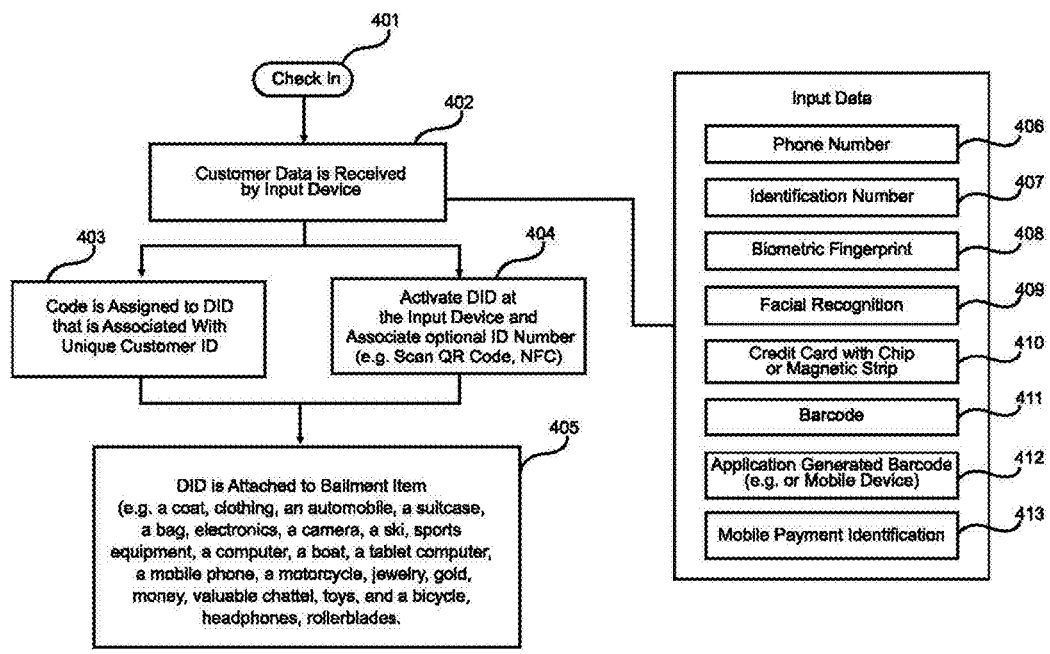
FIG. 2 is a flow chart displaying Check In steps of a computer-implemented bailment method for control of bailment inventory.

An exemplary check in process 401 is illustrated in FIG. 2. As shown in FIG. 2, the method 401 includes receiving a customer identifier at an input device 402. The customer identifier (data) at the input device 402 may include any data that identifies a customer, including a phone number 406, identification number 407, biometric fingerprint 408, facial recognition 409, credit card with a chip or a magnetic strip 410, barcode 411. application-generated barcode (from a mobile device) 412, and mobile payment identification 413. The application-generated barcode (from a mobile device) 412 would typically be generated by an "app" on a customer's phone and read by a scanner of input device 202. DID 306 is activated, such as by scanning a bar code (QR) or by NFC 404. The system assigns a code to the DID 403. This code is sent out to the DID 306 at time of check out. The DID 306 is attached to the bailment item 405. The attachment of the DID 306 can be either direct or indirect. For example, the DID 306 can be attached directly by a clamp to a bailment item, or alternatively be attached to an object that holds the bailment item, such as a hanger. The DID 306 is simply stored with the bailment item 405.

Figure 3:
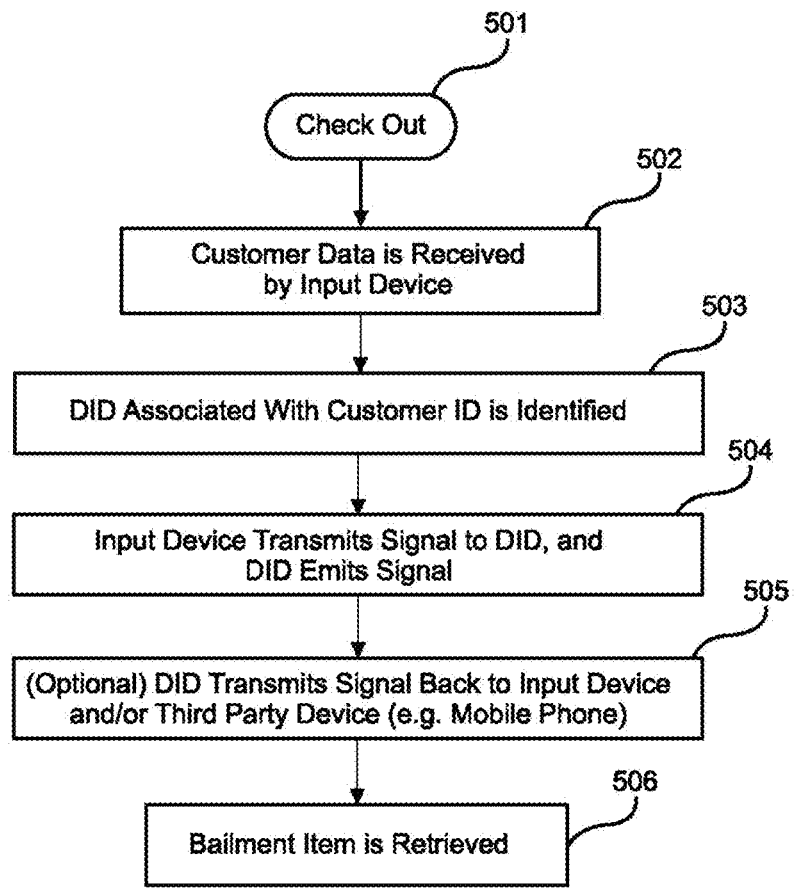
FIG. 3 is a flow chart displaying Check Out steps of a computer-implemented bailment method for control of bailment inventory.

An exemplary check out process 501 is illustrated in FIG. 3. As shown in FIG. 3, the check out method 501 includes receiving customer identifier by the input device 502. This step is typically performed by a customer, but can also be performed by an attendant. After the customer identifier is received, the system identifies the DID 306 that is associated with the customer identifier 503. A signal is sent 504 from input device to the DID 306, and the DID 306 emits a signal, such as visual (light), audio (sound), vibration, to draw attention of the attendant.

Optionally, the DID 306 can have a transmitter with or without a GPS (Global Positioning Satellite) and/or geolocation, and can send a signal back 505, such as with the location of the DID 306. The attendant then looks for the DID 306 that is sending a signal and retrieves the bailment item 505. In the event the system fails, the hangers or other objects for holding bailment items can have a number that is displayed on the DID identification display (FIG. 23), and can be retrieved manually.

Figure 4:
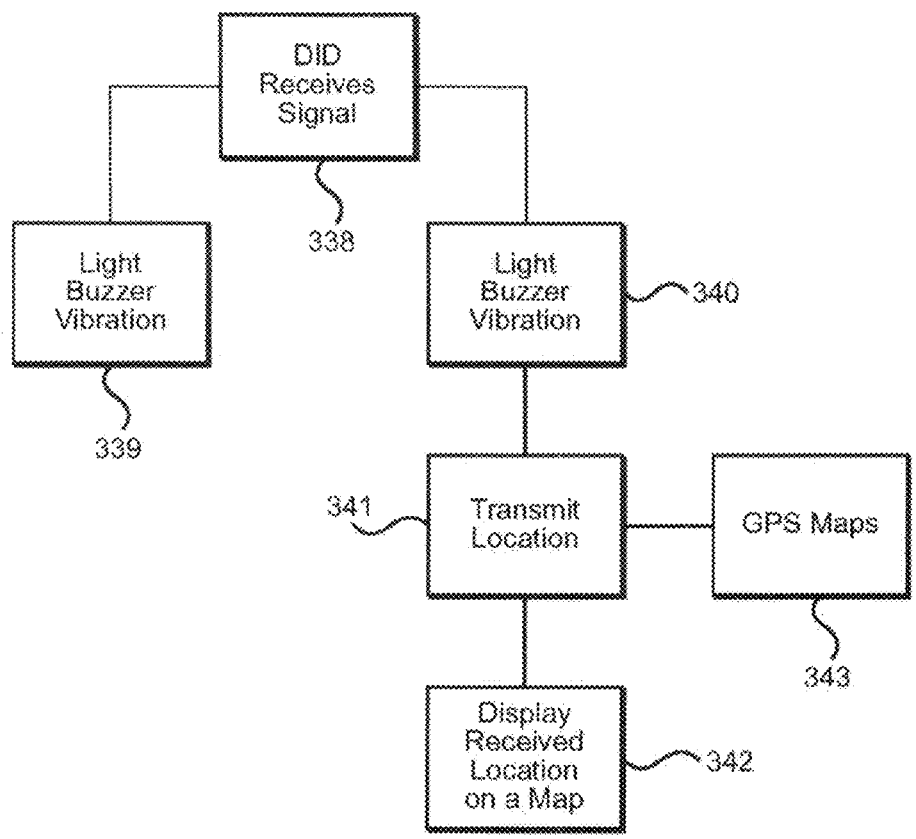
FIG. 4 is a flow chart displaying the steps a Digital Input Device takes after receiving a signal.

FIG. 4 illustrates an embodiment where the DID transmits a signal 338. In this embodiment, after receiving a signal and confirming the code, the DID can send an audio, visual, and/or vibration signal 339, 340. The DID can also, or only exclusively, also transmit a location 341. Transmitting of the location 341 can be done first, followed by a time delayed light, buzzer and/or vibration to conserve battery of the DID 306. For example if the DID 306 determines that bailment item, for example a car, is far from the attendant and it will take attendant some time, the DID 306 may delay the visual and/or other signal to conserve battery. The location can be transmitted back to the input device 202 and/or a mobile device, such as a phone, carried by an attendant, typically a valet parking attendant. The mobile device can have software to map 342, 342 the location of the DID 306.

The input devices 202 are configured to transmit a signal to the digital input devices 306. Upon reception of the signal, the DID 306 can be configured to compare the code carried by the signal and determine whether the code matches the code of the DID 306 or is meant for another DID 306. If a positive match is established, the DID 306 emits a signal 504.

Figure 5:
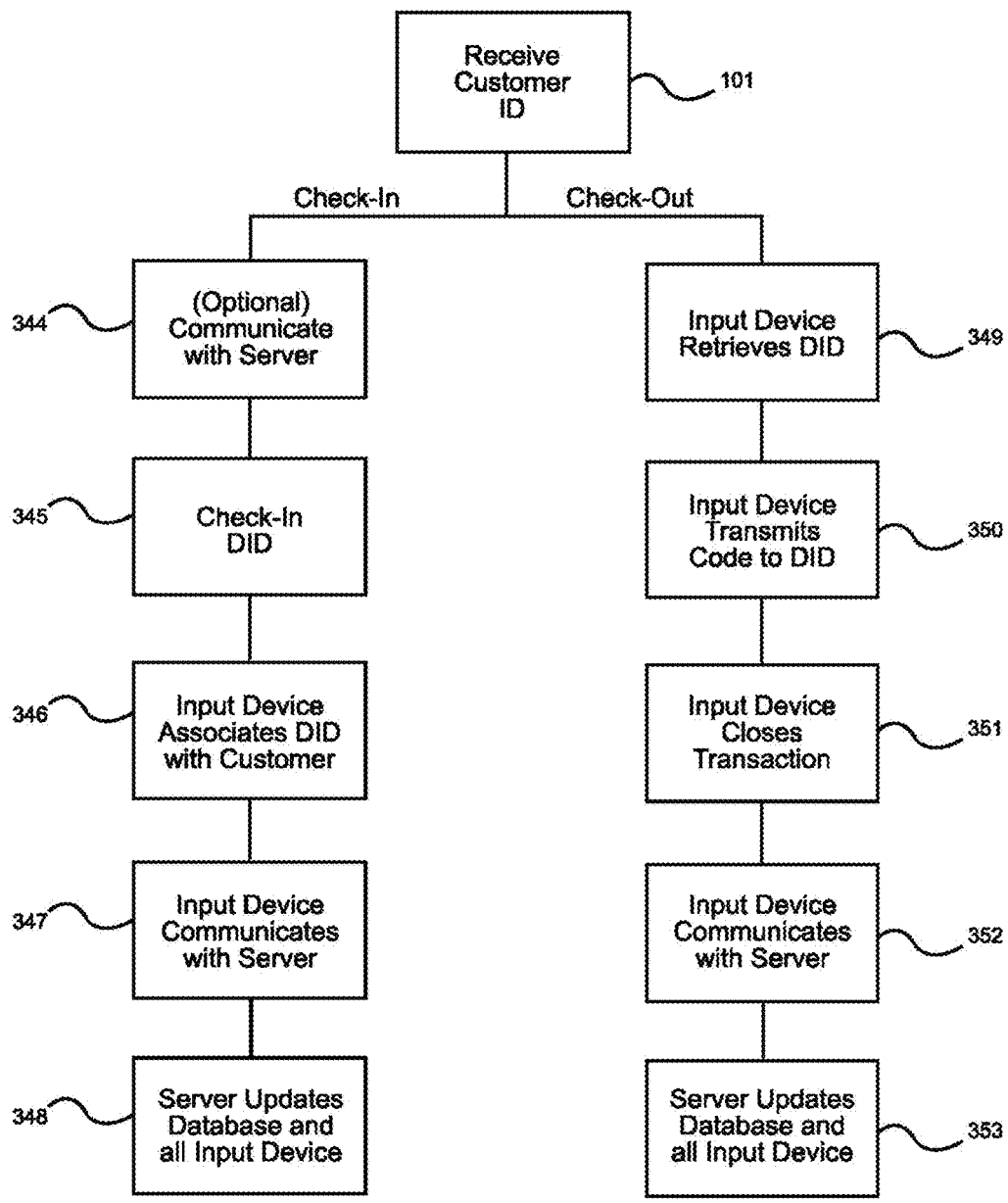
FIG. 5 is a flow chart displaying steps the system takes in checking in and checking out a bailment item.

As illustrated in FIG. 5, in one embodiment, the system is set up so that when a customer checks in at an input device 202, the input device, as a default communicates 344 with server 206 about the customer based on the customer ID. This default communication 344 can be optional. The server searches the database 207 for the customer. The server 206 then communicates to the input device 202 about the customer, particularly whether the customer has a preexisting account. An attendant brings a hanger (or other objects) with an NFC chip within proximity to the input device 202 and checks in or activates the hanger/DID 345. An NFC communication channel is established, the identity of the DID/hanger 306 is determined by the input device 202, and the input device associates the DID 306 with a particular customer 346. The server updates the database and each input device as to which customer ID corresponds to which DID device 347, 348. If the DID 306 is not part of the hanger, the DID 306 is then attached to the bailment item. The attendant then stores the bailment item. During checkout, after input of the customer information into the input device, the input device 202 identifies the customer and the corresponding DID 306, and sends an RFID signal to the DID 306 identified by the server 349, 350. The input device 202 then sends an RFID signal 350 to the DID 306. The input device 202 closes the transaction 351, and communicates with the server 352. The server then updates the database and all input devices 353. The system can include the step of deactivating the DID 306 at end of the process with the use of NFC or other communication. The server updates the database and the input devices that the customer has checked out. Steps 345, 346, 349, 350, and 351 can be carried out independently by the input device 202 without the need to communication with a server.

Figure 6:
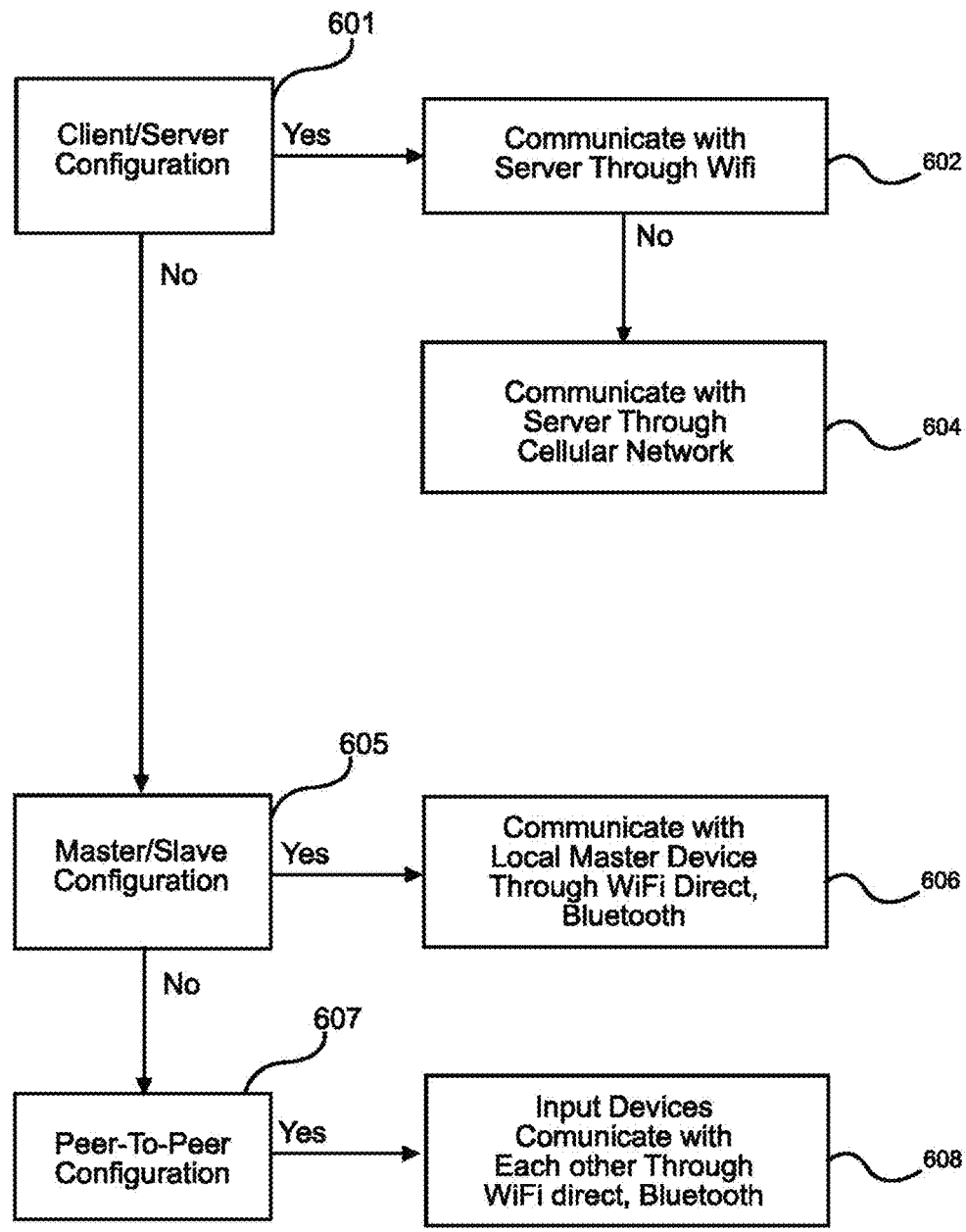
FIG. 6 is a flow chart displaying steps taken in prioritizing communication channels in the bailment system.

The system is set up to work with different communication protocols and even when communication with the server is disrupted. An exemplary internet connection decision tree is shown in FIG. 6. As can be seen, in the client/server configuration 601, a connection is first attempted to be established between an input device 202 and the server 206 through WiFi 602. If the WiFi 602 connection fails, the system will attempt a connection through cellular communication 604. Subsequently, if that connection fails as well, the next step is to work through the master-slave model 605, where such connection can be carried out with WiFi direct or Bluetooth. The master can be any local device, such as mobile phone, a local server, or an input device, and updates the input devices 202. If such a connection also fails, the input devices 202 will communicate to each other in a peer-to-peer manner 607, 608 and update each other. The network will allow input devices 202 to communicate with each other even when there is no internet connection. This communication can be based on any network topology like mesh/any other ad-hoc network or master-slave using WiFi Direct, Bluetooth or a router. The network can be turned-off (disabled) as a default when a communication with a server through internet is established. The input devices 202 can be configured to communicate with a cloud based server with WiFi, and in event of a failure of WiFi, to communicate to the server through data connection over 3G/4G or any other mechanism provides by telecommunication vendors, and in event of failure of WiFi, data connection or other mechanism, to operate without the cloud based server using local network based on any of the network topology like mesh/any other ad-hoc network or master-slave.

Figure 7:
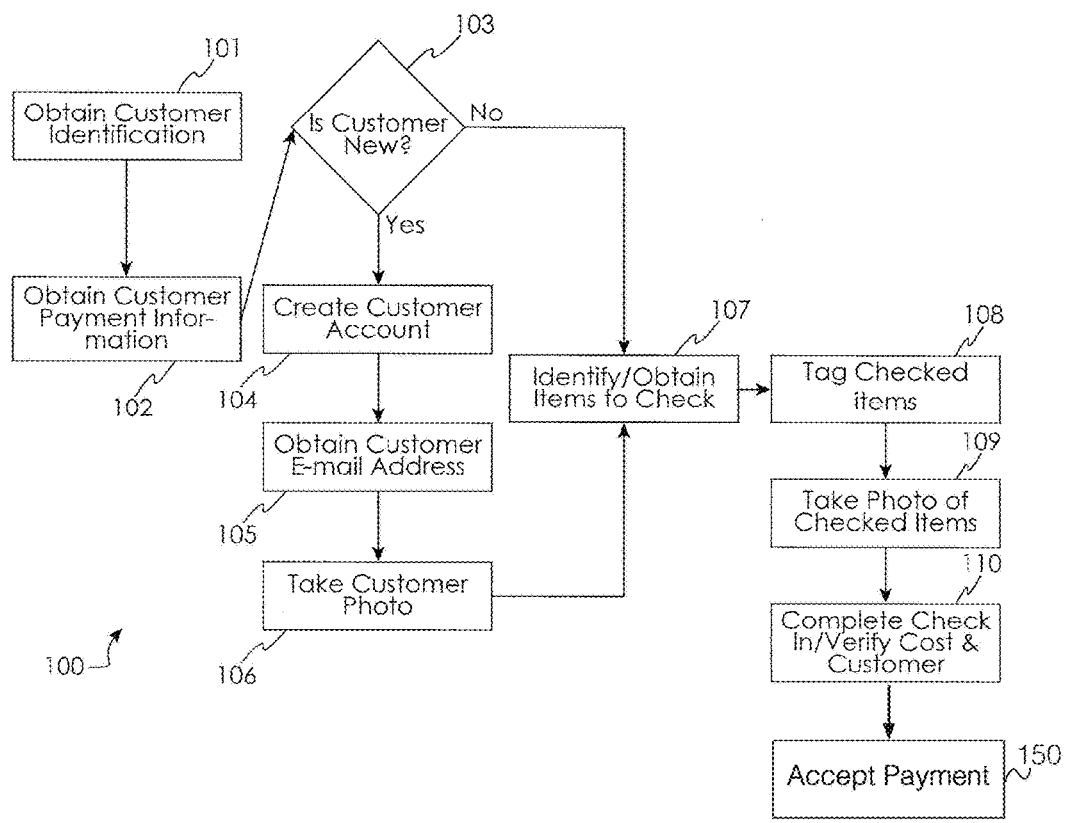
FIG. 7 is a flow chart displaying Check In steps of a computer-implemented bailment method for control of bailment inventory.

Referring now to FIG. 7, a flow chart displaying steps in a computer-implemented bailment method 100 for control of bailment inventory according to at least one embodiment of the present disclosure is shown. As shown in FIG. 7, the method 100 includes obtaining customer identification in step 101, obtaining customer payment information in step 102, determining whether the customer identification identifies a previously known customer in step 103, optionally creating a customer account in step 104, optionally obtaining a customer email address in step 105, optionally taking a customer photo in step 106, identifying and obtaining items to check in step 107, tagging checked items in step 108, taking a photograph of each checked item in step 109, and completing check in and verifying the cost of check in and the customer in step 110. A payment can be obtained at end of the process.

Figure 8:
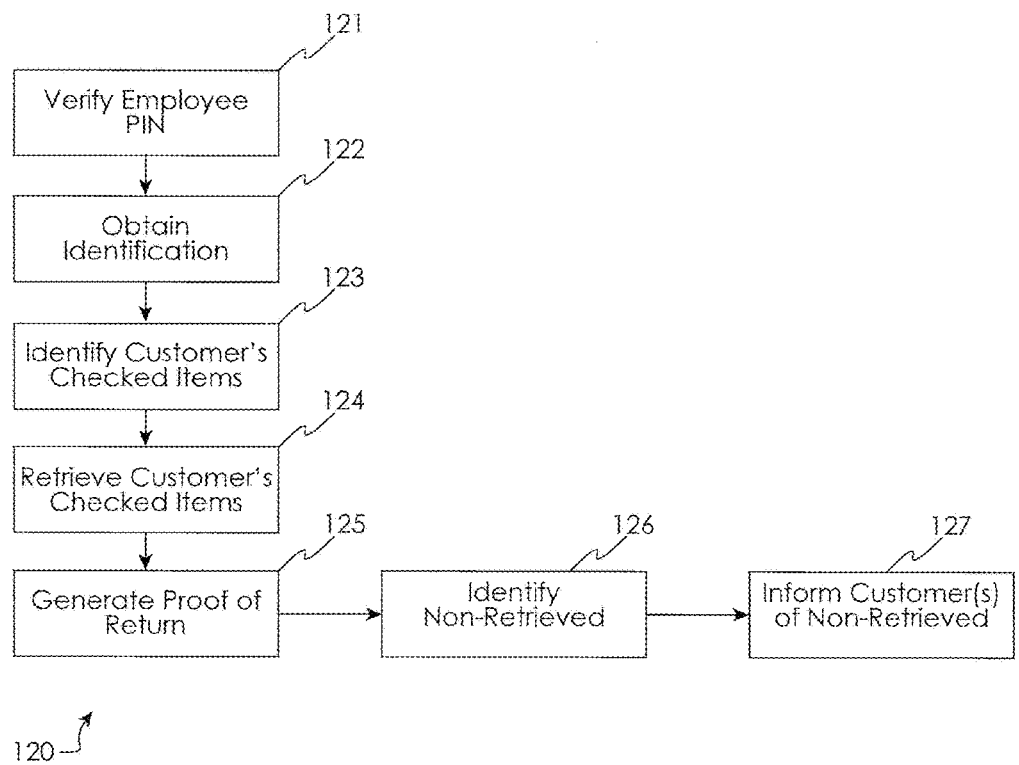
FIG. 8 is a flow chart further displaying Check In steps of a computer-implemented bailment method for control of bailment inventory.

Referring now to FIG. 8, a flow chart displaying steps in a computer-implemented bailment method 120 for control of bailment inventory. As shown in FIG. 8, the method 120 includes verifying an employee PIN in step 121, obtaining customer identification in step 122, identifying the customer's checked items in step 123, retrieving the customer's checked items in step 124, generating a proof of return of the checked items in step 125, identifying any non-retrieved items in step 126, and informing any customers associated with the non-retrieved items in step 127. One or more of these steps can be optional.

Figure 9:
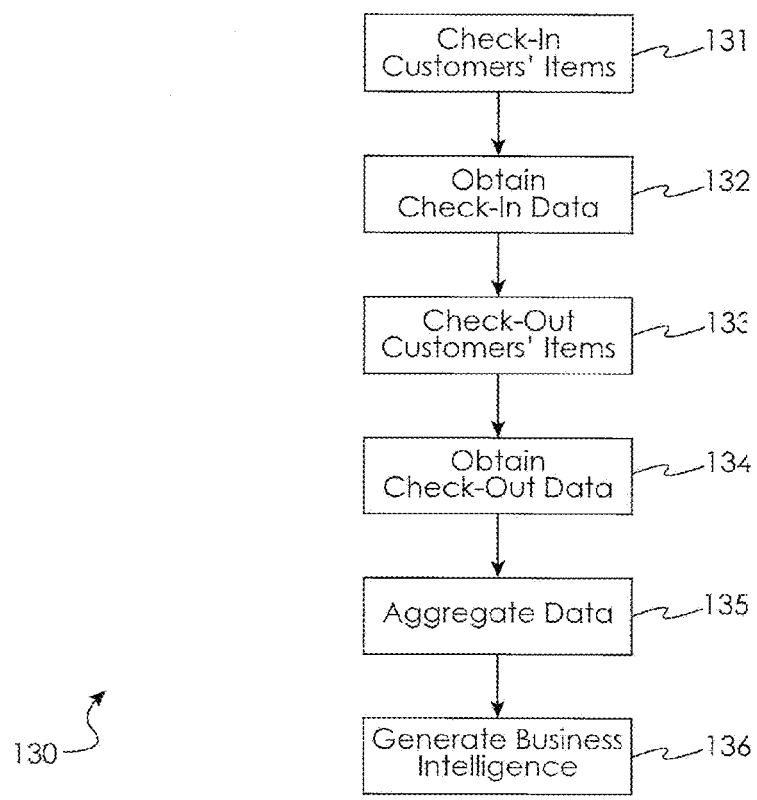
FIG. 9 is a flow chart further displaying Check In steps of a computer-implemented bailment method for control of bailment inventory.

Referring now to FIG. 9, a flow chart displaying steps in a computer-implemented bailment method 130 for control of bailment inventory according to at least one embodiment of the present disclosure is shown. As shown in FIG. 9, the method 130 includes checking in customers' items in step 131, obtaining data associated with checking in customers' items in step 132, checking out customers' items in step 133, obtaining data associated with checking out customers' items in step 134, aggregating the data in step 135, and optionally generating business intelligence reports in step 136. One or more of these steps can be optional.

Figure 10:
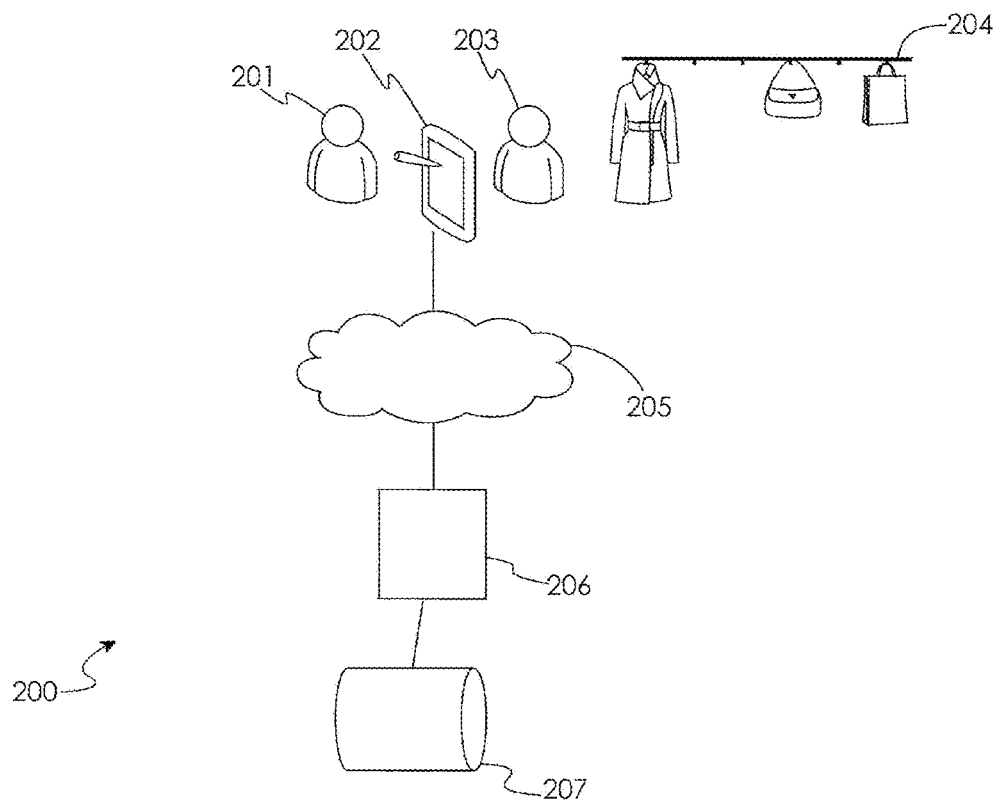
FIG. 10 is a diagram displaying components of a computer-implemented bailment system.

Referring now to FIG. 10, an architecture diagram displaying components of a computer-implemented bailment system 200 for control of bailment inventory is shown. Only a single input device 202 is illustrated in this figure. It is within the scope of the present disclosure for the system 200 to have two or more input devices 202 operating at the same time. As shown in FIG. 10, the system 200 includes a customer 201, an input device 202, an employee 203, a bailment storage unit 204, a computer network 205, a Server 206, and a database 207. For purposes of clarity, there is shown only one bailment input device 202 in FIG. 10. In the embodiment shown in FIG. 10, input device 202 is operated by the customer 201 and an employee 203. In the embodiment shown in FIG. 10, the bailment storage unit 204 includes a storage area or device for holding items in bailment, such as, for example, a coat rack, set of lockers, private area, or other holding location.

In at least one embodiment of the present disclosure, input device 202 is configured to send data to the Server 206 through the computer network 205. In such an embodiment, the input device 202 may engage in bidirectional communication with the Server 206 through the computer network 205, such as, for example, through TCP/IP networking. In at least one embodiment of the present disclosure, the computer network 205 includes the Internet, but this is not required. The order of preference for communication through computer network 205 is illustrated in FIG. 4.

In at least one embodiment of the present disclosure, the input device 202 sends data to the server 206 about checked items, customers, received items, non-retrieved items, and other information generated through execution of at least some of the steps of the methods disclosed herein.

Server 206 comprises one or more server computers, computing devices, or systems of a type known in the art. Server 206 further comprises such software, hardware, and componentry as would occur to one of skill in the art, such as, for example, microprocessors, memory systems, input/output devices, device controllers, display systems, and the like. Server 206 may comprise one of many well-known servers, such as, for example, IBM's AS/400 Server, IBM's AIX UNIX Server, or MICROSOFTs WINDOWS NT Server. In FIG. 10, Server 206 is shown and referred to herein as a single server. However, Server 206 may comprise a plurality of servers or other computing devices or systems interconnected by hardware and software systems know in the art which collectively are operable to perform the functions allocated to Server 206 in accordance with the present disclosure.

In at least one embodiment of the present disclosure, Server 206 is connected to database 207. In such an embodiment, Server 206 retrieves data from input device 202, processes the data (i.e. by generating business intelligence reports, compressing the data, or otherwise), and stores the data in the database 207.

The database 207 is configured to store data, business intelligence reports, and any information generated through execution of one or more of the steps of one or more of the methods disclosed herein. Database 207 is "associated with" Server 206. According to the present disclosure, database 207 can be "associated with" Server 206 where, as shown in the embodiment in FIG. 10, database 207 resides on Server 206. Database 207 can also be "associated with" Server 206 where database 207 resides on a server or computing device remote from Server 206, provided that the remote server or computing device is capable of bi-directional data transfer with Server 206. In at least one embodiment, the remote server or computing device upon which database 207 resides is electronically connected to Server 206 such that the remote server or computing device is capable of continuous bi-directional data transfer with Server 206.

For purposes of clarity, database 207 is shown in FIG. 10, and referred to herein as a single database. It will be appreciated by those of ordinary skill in the art that database 207 may comprise a plurality of databases connected by software systems of a type well known in the art, which collectively are operable to perform the functions delegated to database 207 according to the present disclosure. Database 207 may comprise a relational database architecture or other database architecture of a type known in the database art. Database 207 may comprise one of many well-known database management systems, such as, for example, MICROSOFTs SQL Server, MICROSOFTs ACCESS, or IBM's DB2 database management systems, or the database management systems available from ORACLE or SYBASE. Database 207 retrievably stores information or documents that are communicated to database 207 from input device 202, Server 206 or through computer network 205.

Figure 11:
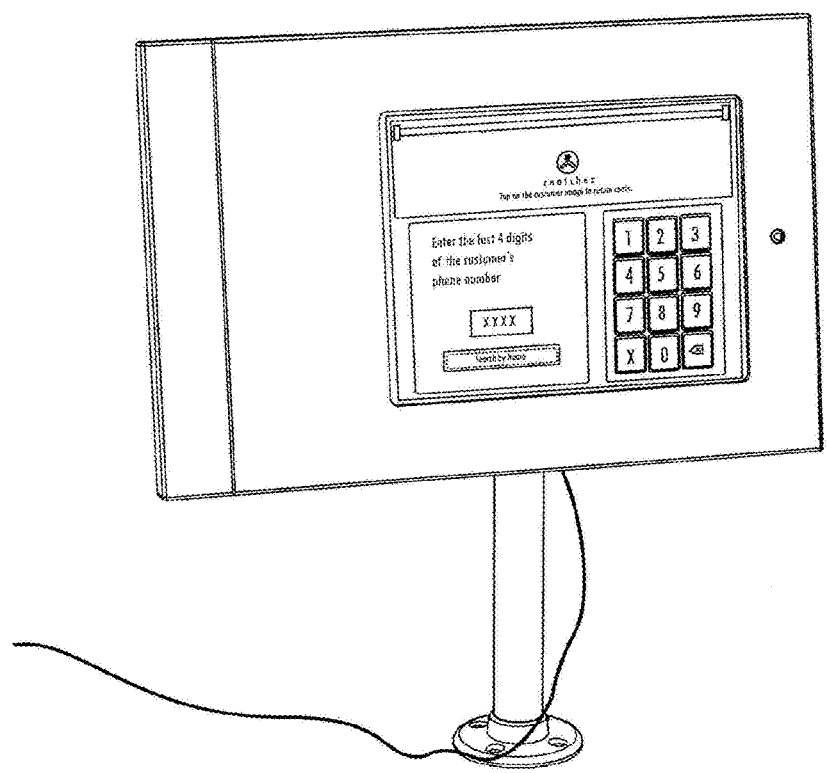
FIG. 11 is a front perspective view of one embodiment of an input device.
Figure 12:
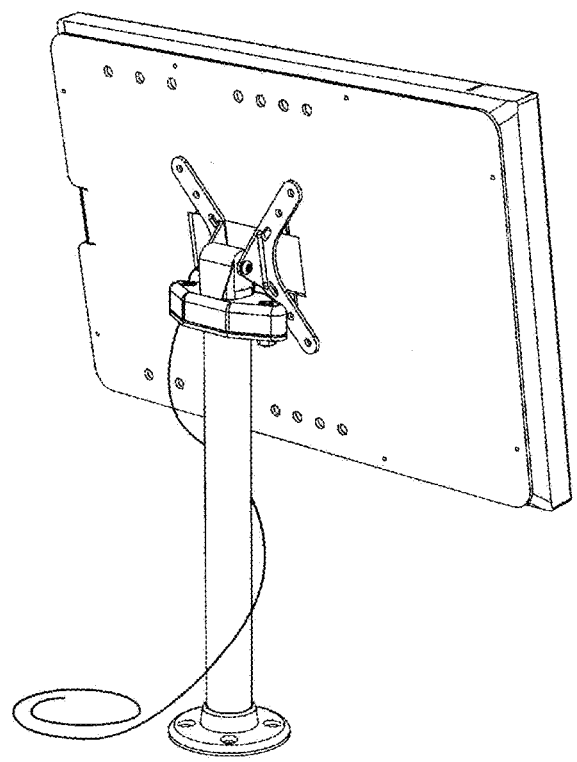
FIG. 12 is a rear perspective view of the input device of FIG. 11.

An exemplary embodiment input device is shown in FIGS. 11 and 12. As can be seen, the input device comprises a tablet computer, such as iPad or an Android, contained within a custom aluminum case that allows the touch screen of the iPad2 to be accessed through the case. The case further includes an integrated payment card reader that allows a payment card to be swiped by the user and information to be read off of the card's magnetic stripe and transferred to the iPad2. The case is mounted to a stand by means of a pivoting bracket. This bracket allows the input device to be flipped over so that in a first position the input device touch screen faces a customer on one side of a counter to which the stand is attached, and in a second position the input device screen faces an employee attendant on the opposite side of the counter. FIGS. 11 and 12 show one embodiment coat check station in which the input device is attached to a counter for use by both customers and attendants, as described in greater detail herein below.

The check-in and check-out processes described in the various embodiments disclosed herein are entirely ticketless, relieving the customer of the need to retain and later retrieve a ticket or other token. In some embodiments, the check-in and check-out processes are also documented with photographs. In some embodiments, customers who fail to retrieve a coat are automatically reminded of this electronically, and given instructions for coat retrieval.

The Check-In Process

During the first several steps in the check-in process, the customer interacts with a input device, such as the one illustrated in FIGS. 11-12, freeing the attendant to handle other things. In some embodiments, the input device includes a swivel that enables yaw, pitch, and/or roll rotation.

Figure 13:
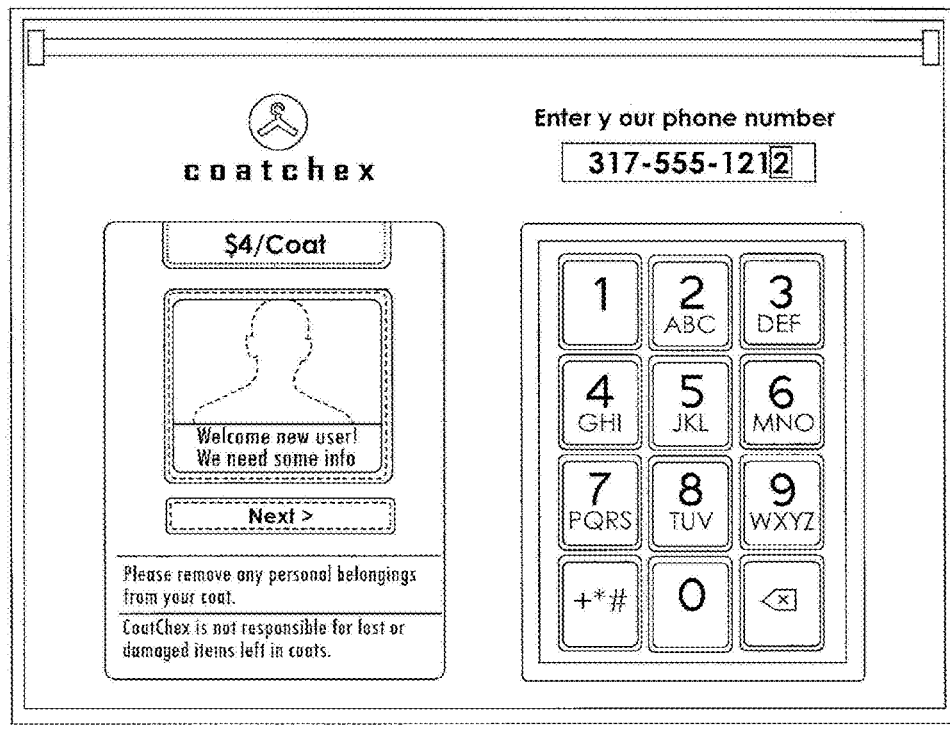
FIG. 13 is a screen display of a check-in step of the computer-implemented bailment system and method.

In some embodiments, the input device includes a touch screen to make it easy for the customer to select options and to enter alphanumeric data. In some embodiments, the customer begins the check-in process by entering their identification number into a station's input device. In some embodiments, a customer's telephone number is their primary identifier in the bailment inventory system. For example, FIG. 13 illustrates a sample screen that may be displayed on the input device prompting the customer to enter his/her telephone number and the customer telephone number being entered into the input device. The input device screen may display a numeric or alphanumeric keypad to facilitate this. Other input means, such as an attached keyboard, mouse, voice recognition system, etc. may also be used for data input It should be appreciated that it is within the scope of the present disclosure for the input device to include any type of primary identifier for a customer, such as, for example, a telephone number, email address, or social media identifier (Twitter handle, Facebook page, LinkedIn account, etc.).

In other embodiments, the customer may swipe a credit card, debit card, or other type of identification card (collectively referred to herein as "payment card"), and the system will record the customer's name and every Nth digit (where N is an integer) of the card number to use as the customer identification number. Such information may be obtained from the magnetic strip on the back of the card or wirelessly. This allows a unique customer identification number to be created without the liability of storing credit/debit card numbers in the system database. Other embodiments use other means for identifying customers, such as customer-selected personal identification numbers, fingerprint scans, handprint scans, retinal scans, or any other means available for identifying the customer. Those skilled in the art will recognize that the means used for identifying the customer are not critical to the present disclosure. For ease of description, all such means will be referred to herein as an "identification number," regardless of whether such means is a number or even includes numbers.

Figure 17:
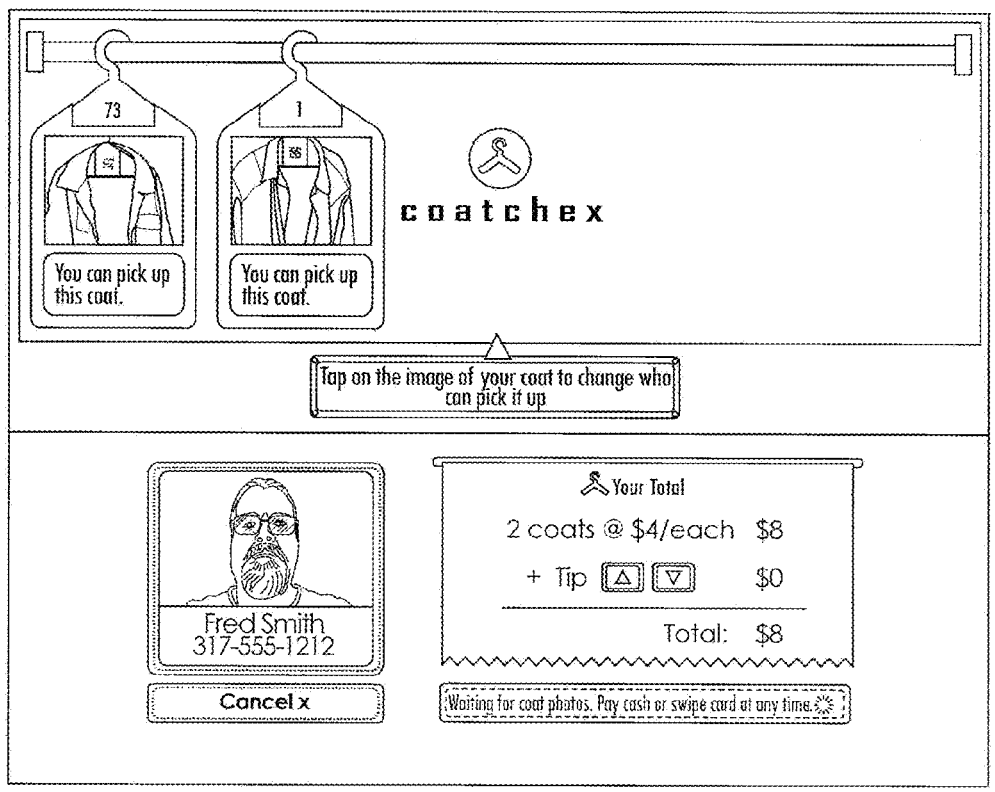
FIG. 17 is a screen display of a check-in step of the computer-implemented bailment system and method.

Once a customer has used the bailment inventory system once, an account is created for that customer in the system database. This makes future use of any bailment inventory station faster for a repeat customer. Once the customer has entered the customer identification number, the system compares the entered identification number to the existing customer identification numbers stored in the system database to determine if the customer is a new customer or a returning customer. FIG. 17 illustrates the display screen after it has determined that the telephone number entered matches the identification number in the system database of Fred Smith. The screen displays a photograph of Fred Smith that was obtained in a previous transaction (as described hereinbelow) and displays a "welcome back" message. As will be appreciated by those skilled in the art, the specific layout, content, and order of the various screen displays shown herein as exemplary embodiments may be configured in a variety of ways.

Figure 14:
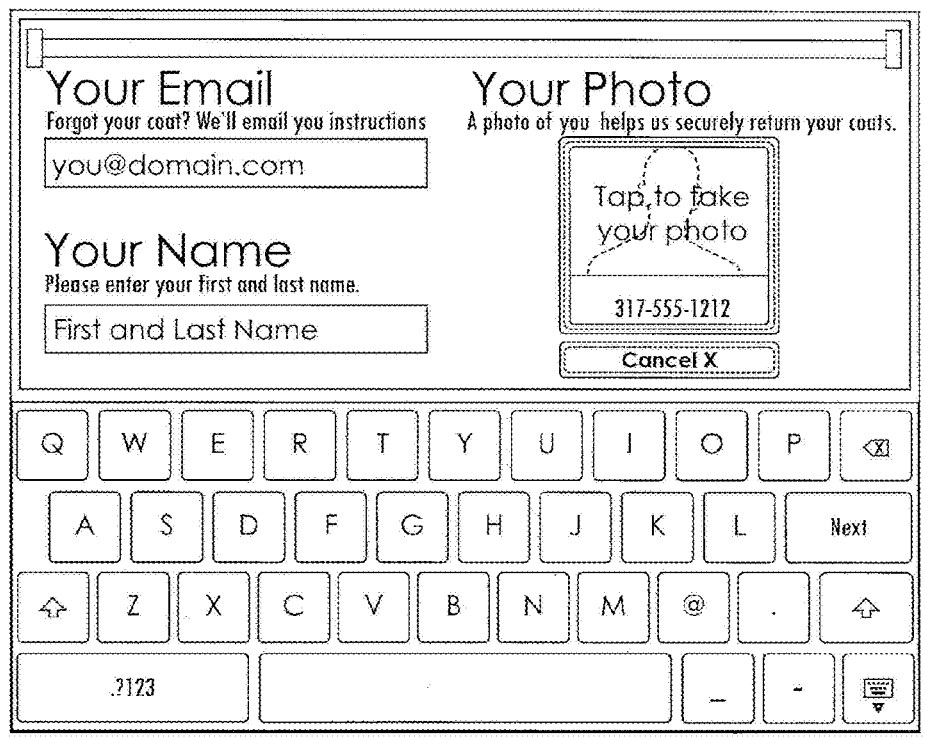
FIG. 14 is a screen display of a check-in step of the computer-implemented bailment system and method.
Figure 15:
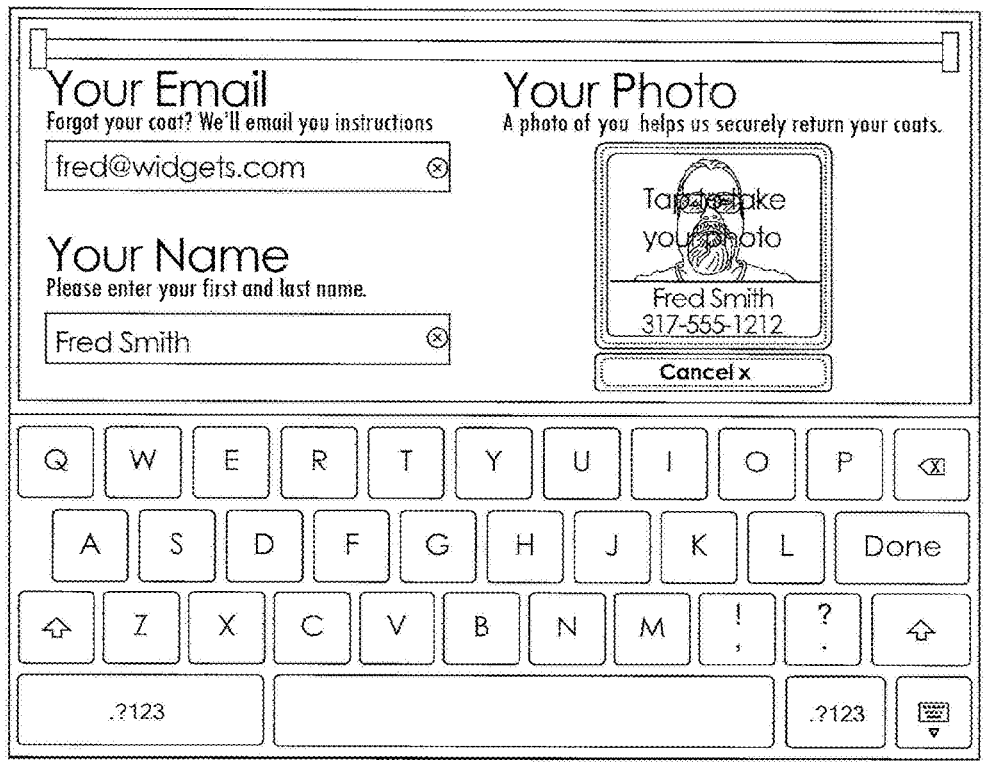
FIG. 15 is a screen display of a check-in step of the computer-implemented bailment system and method.
Figure 16:
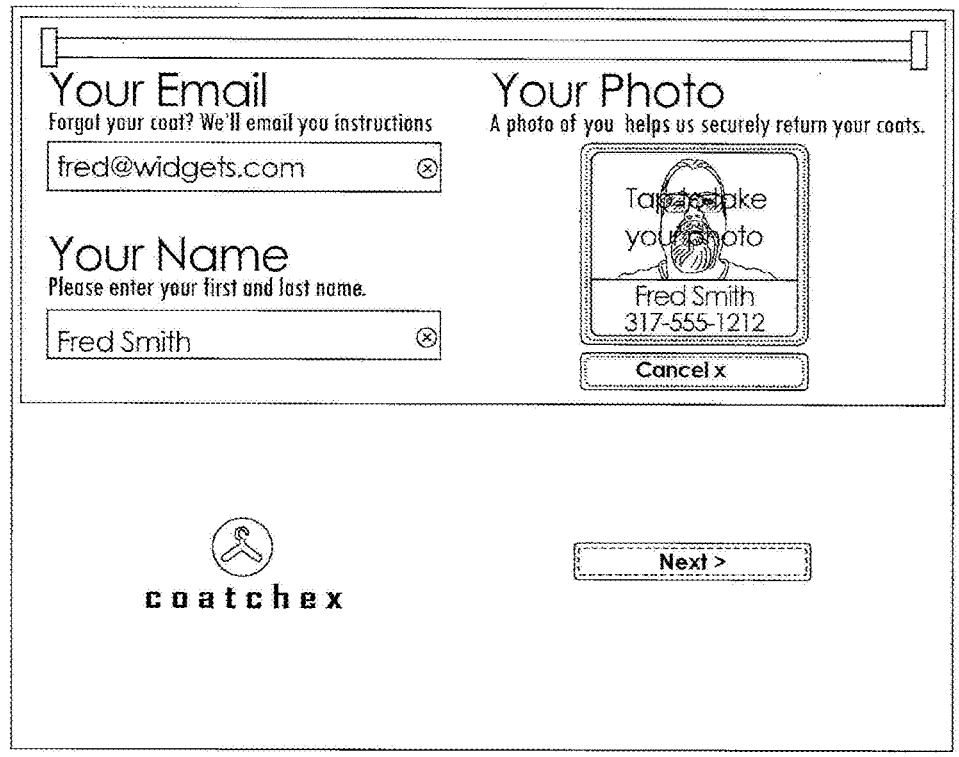
FIG. 16 is a screen display of a check-in step of the computer-implemented bailment system and method.

In some embodiments, when the identification number entered by the customer does not match any identification number in the system database, the new customer will be prompted to enter their email address (this allows the system to contact the customer in case the customer forgets to pick up his coat), and the customer's name. This is shown in FIG. 14, where the screen displays a touch keyboard for the customer to use for data entry. The system may also create a photograph of the customer for the system database at this time using the front camera on the input device. As shown in FIG. 14, the touch screen invites the customer to tap the screen to take a photograph when the customer is ready to do so. As shown in FIG. 15, in some embodiments the touch screen allows the customer to tap the screen to cancel the photograph and to take another. FIG. 16 shows an exemplary screen with the customer information entered and the customer photograph displayed, inviting the customer to tap a "Next" button to indicate that they are happy with the photograph and wish to continue with the check-in process. Returning customers pass over these account creation steps, as the system already has their information.

The customer next provides the coats they will be checking to the attendant. The system may be programmed to limit the number of coats any one customer can check in a given transaction. The system may additionally be programmed with a payment amount to be charged per coat checked, although in some embodiments there is no charge for checking coats.

As illustrated in FIG. 17, the attendant takes the coat(s) that the customer wishes to check, and puts each one on a bailment inventory hanger.

Once the coat is on the hanger, the attendant will position it behind the input device. In some embodiments, a mount (not shown) is provided behind the input device to position the coat on the hanger in an advantageous position. In some embodiments, the input device includes both a front-facing camera and a rear-facing camera. For example, the input device includes both of these features, and the data obtained with either camera is available to software being executed by the tablet. The input device software will recognize the QR code and this will cause it to create a photo of the hanger and upper portion of the coat. These steps are repeated for each coat the customer is checking in. The coat can then be placed on a rack at a location corresponding to the hanger number. In some embodiments, a photograph is taken of the customer handing the bailed property to the attendant.

As each coat is photographed, the display facing the customer is updated to reflect the total cost (if any) for checking the coat(s). As shown in FIG. 17, the customer may add a tip for the attendant by tapping up and/or down arrows on the screen, for example.

Figure 18:
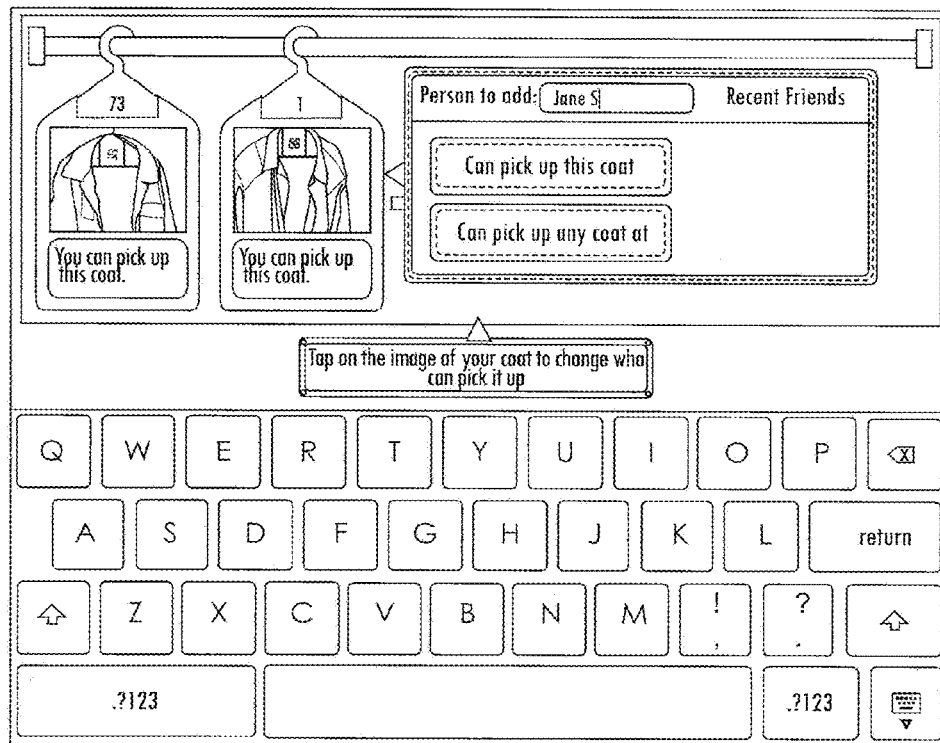
FIG. 18 is a screen display of a check-in step of the computer-implemented bailment system and method.
Figure 19:
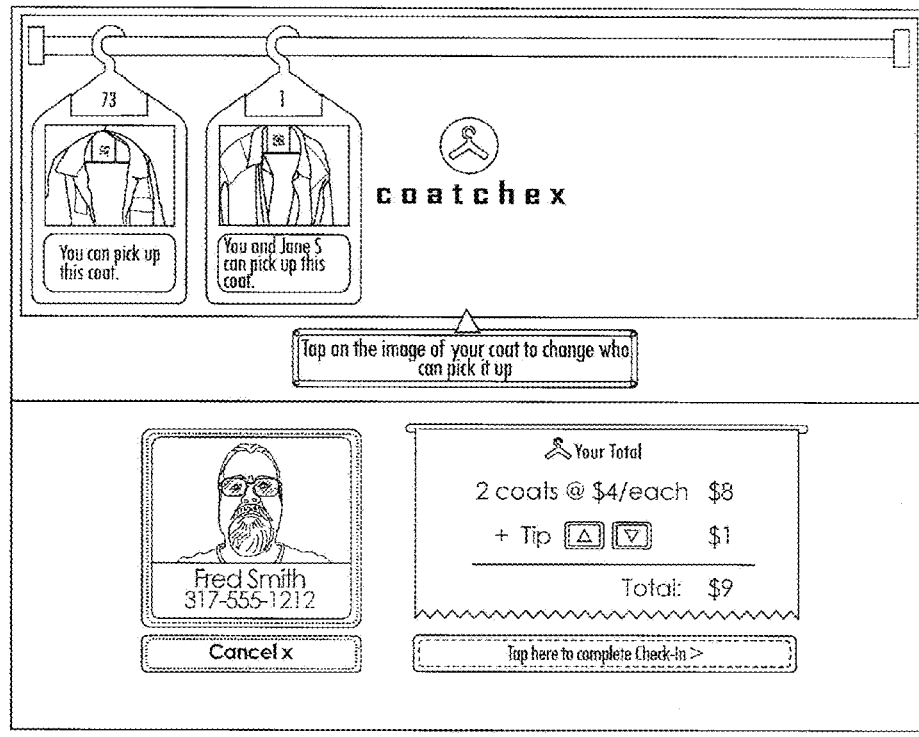
FIG. 19 is a screen display of a check-in step of the computer-implemented bailment system and method.

As the coats are being photographed, the input device displays these images to the customer on the screen on the front of the input device as shown in FIG. 17. The screen notifies the customer to tap on a coat photo if the customer would like to authorize another person to check-out the particular coat. This may happen, for example, when the customer is checking all of the coats for a group, and wishes any member of the group to be able to retrieve their coat when they wish to leave. As shown in FIG. 18, an optional feature, tapping on a photo of a coat causes a box to be displayed in which the customer may enter (using a touch keypad again displayed on the screen) the name of another person who is authorized to check-out this coat (or, optionally, any of the coats). As shown in FIG. 19, the individual coat photographs display the check-out authorizations that have been assigned to them.

With continuing reference to FIG. 19, once all coats being checked have been photographed and displayed to the customer, the customer is prompted to click a button on the input device screen to complete check-in, thereby acknowledging that these photos are representative of the property offered for bailment.

Once the customer has designated how many coats they wish to check, the input device optionally presents a total cost for checking the items, and prompts the customer to make payment by swiping a credit card, debit card, or other payment card, or presenting cash to the attendant. In some embodiments, customers may also pay through a pre-funded account subscription service, described hereinbelow.

In some embodiments, if the customer pays with cash, the attendant will hold a card with a QR code associated with the attendant in front of the rear-facing camera, causing the camera to take a picture of the card. When the attendant lets the camera take a photograph of their card, this indicates to the system that the attendant has received cash from the customer for the items checked. This allows the system to keep track of how much cash each attendant has received. This data may be used to ensure that the total amount of cash received by the attendant during the course of a shift is actually turned over to the owner of the system (or other person entitled to the proceeds of the bailment process).

With continuing reference to FIG. 19, when the customer clicks the "complete" button, the input device creates a photo of the customer using the front-facing camera and displays a message indicating that the check-in process is complete. Clicking the "complete" button completes check-in process. In some embodiments, customers will be emailed a receipt for the transaction, but in many embodiments they do not receive any form of ticket as evidence of the bailment.

The bailment inventory system now has the customer's name and contact information, photos of the customer, photos of the coats being checked, and has recorded the numbers on the hangers used for the customer's coats. Since the customer does not have to retain any type of ticket or other token as a means for retrieving the bailed items, there are no concerns that the customer will lose the ticket and thereby significantly complicate the check-out process.

The Check-Out Process

As described above, in some embodiments the input device is mounted such that it can be swiveled between the attendant or the customer. In some embodiments, the bailment inventory input device, such as an iPad or an Android device, contains an accelerometer and/or a gyroscope to sense movement of the input device. When the input device is in a first position with the screen facing the customer, it displays a "customer interface" screen that is designed for interaction with the customer. When the input device is swiveled to the attendant, the system displays an "employee interface" screen that is designed for use by the attendant. Moreover, when the input device is flipped toward the attendant, the screen is rotated 180 degrees (upside down) relative to its position when facing the customer. Therefore, the employee interface screen is displayed in an orientation that is rotated 180 degrees (upside down) relative to the display orientation of the customer interface screen. These two switches happen automatically when the input device senses the change in orientation between the customer-facing position and the attendant-facing position.

Figure 20:
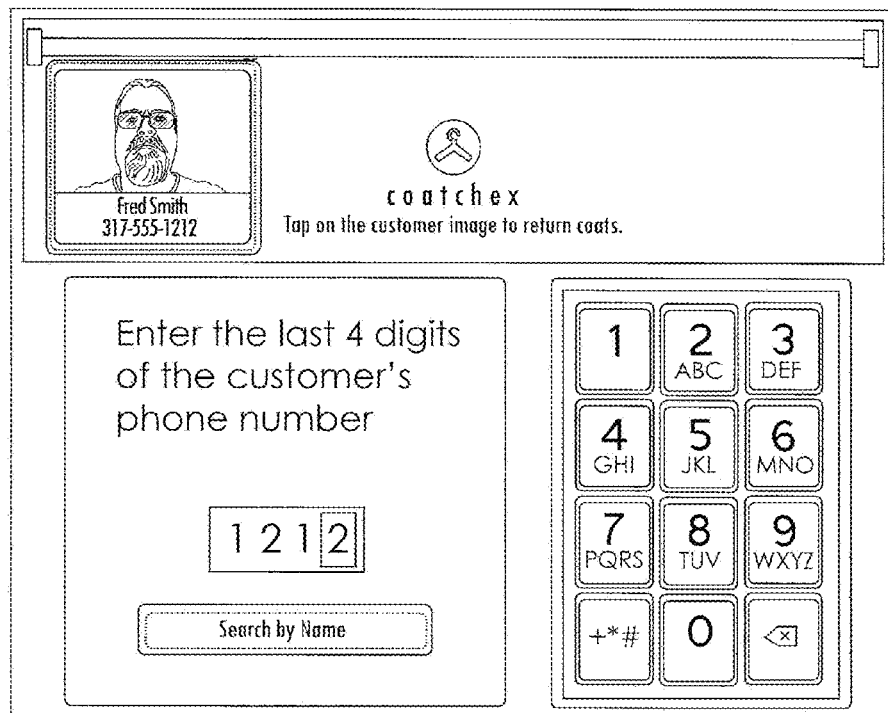
FIG. 20 is a screen display of a check-in step of the computer-implemented bailment system and method.

When switched to the employee interface screen, an attendant log-in page is displayed (not shown), prompting for the attendant to enter their employee PIN. In embodiments where the customer identification number is formed from information read from the customer's payment card, once the attendant has logged in, the customer is asked to swipe their card through a card reader attached to (or otherwise associated with) the bailment inventory input device. The input device will then retrieve the information regarding the coat(s) checked by this customer, including displaying a photograph of the customer for positive identification by the attendant. In embodiments where the customer identification number is the customer's telephone number, once the attendant has logged in the customer is asked for the last four digits of their telephone number. As the digits are entered on the input device touchscreen by the attendant, as shown in FIG. 20, the input device will display the photos and customer names associated with a telephone number that matches the digits already entered by the attendant, filtering down the number of photos as more digits are entered. This allows the attendant to select the photo of the customer standing in front of the attendant without having to enter all of the digits in many cases. In the rare cases where two people at the same event have the same last four digits in their telephone numbers and have checked coats, the attendant will be able to quickly look at the photos and select the appropriate customer. Even when multiple customers share the same last four digits of their telephone numbers, the attendant will be able to narrow down the choices to a manageable few (that can then be selected using the customer photograph) without having to enter the entire 10-digit telephone number. In some embodiments, the customer may be searched for based upon other information, such as the customer's name.

Once the attendant has selected the customer's photo, the employee interface will display the hanger number(s) corresponding to coat(s) checked by the customer, which includes a photograph of each coat the input device will initiate a signal to be sent out to the DIDs. The signal will carry a unique identifier associated with the customer. Once the signal is received by the DIDs, each will compare the unique identifier to that of their own, which was assigned in the check-in process. Once a DID finds a match between the emitted identifier and its own, the DID will emit visual, audio, or audiovisual signals. After the attendant retrieves the checked coat and hands it to the customer, the attendant indicates on the employee interface of the input device that the coat has been returned to the customer, which causes the rear camera of the input device to create a photograph of the customer receiving that coat. This photographic record is stored in the database as a record that the customer did in fact receive the bailed property. In some embodiments, a photograph is taken of the attendant handing the bailed property to the customer (or the customer's designee who is retrieving the bailed property). Should a customer fail to retrieve their coat before an establishment closes, the Bailment inventory system will send a message (such as by email or SMS text message, to name just two non-limiting examples) to that customer with instructions for picking up their coat.

If a customer allowed someone else to retrieve one or more of the coats being checked, and this person later arrives to check out their coat, they simply give the attendant the telephone number of the customer and present photo identification allowing the attendant to determine which of the checked coats they are permitted to check out. The remainder of the check-out process is the same as described above.

For customers that will be using the bailment inventory system on a frequent basis, they may establish a pre-funded account within the bailment inventory system in some embodiments. When checking in, customer's with a pre-funded account with adequate funds therein skip the payment step and the cost of the coat check is deducted from their pre-funded account. The customer therefore completes the check-in process more quickly when using a pre-funded account. In some embodiments, the pre-funded account lets the customer pre-pay for a number of coat checks at a discounted rate. In some embodiments, customers may establish or replenish the pre-funded account by accessing their account data using the internet. In some embodiments, customers may establish or replenish the pre-funded account when checking their coats.

In some embodiments, signals (not shown), such as colored LED lights to name just one non-limiting example, are provided within view of the attendant to provide information about the bailment process to the attendant when the attendant cannot see the screen. Such lights can be mounted in any convenient location where they will be visible to the attendant, such as on the rear of the bailment inventory input device, on the post onto which the input device is mounted, or any other convenient location. The lights may be activated by the input device in any convenient way. As one non-limiting example, the lights may be activated by coupling them to the audio output of the input device (including, for example, in embodiments where the input device comprises an iPad or other tablet computers, including with Android). The lights may be part of an electrical circuit that includes filters to allow the circuit to discriminate between different audio bands, such that the output of an audio signal at a first frequency will cause a first light to illuminate, the output of an signal at a second frequency will cause a second light to illuminate, and so on.

These lights can be used in many ways to provide information to the attendant when the input device screen is facing the customer. For example, the input device may cause a green light to flash every time a bailed article is scanned by the system. As another example, the input device may cause a second, red light to remain illuminated from the beginning of the transaction until the transaction has been paid for. Those skilled in the art will recognize from these non-limiting examples that numerous other signals may be made to the attendant using one, two, or more such lights.

In some embodiments, an input device includes a tripod with an attached mirror. In some embodiments, the tripod may be affixed to the input device to enable the mirror to reflect the light signals towards an employee's field of vision. In such embodiments, the reflection provided by the tripod enables the employee to see the signals without dramatically tilting the input device (as would be the case without the use of the mirror).

Figure 21:
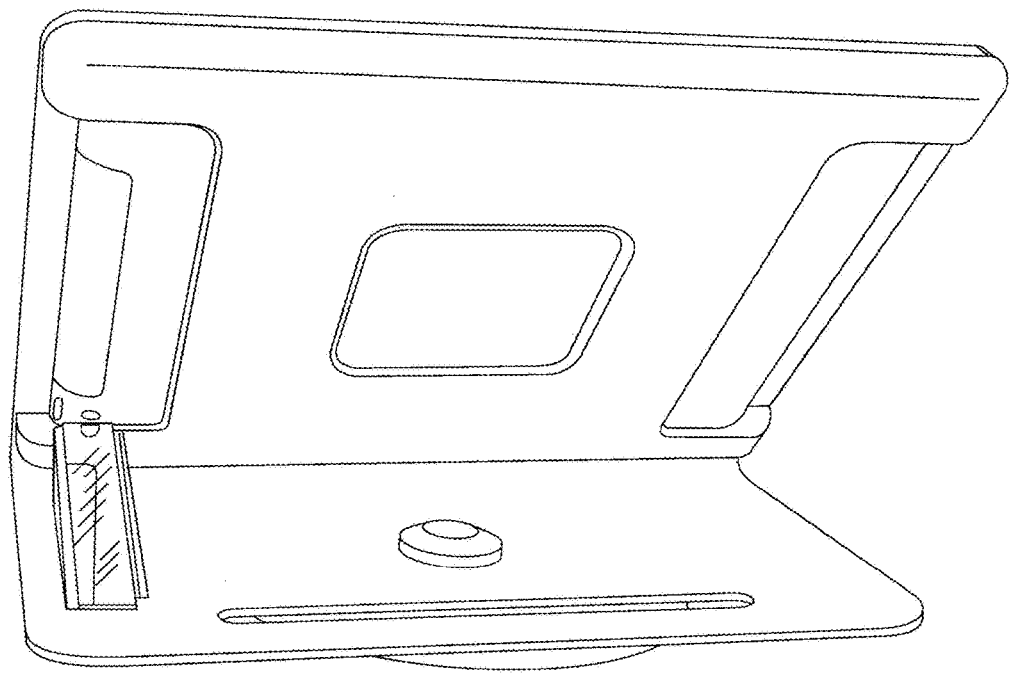
FIG. 21 is a rear perspective view of an input device equipped with a tripod and mirror.

In some embodiments, the tripod may provide a reflection of a customer and/or items for bailment owned by the customer towards the eye of a camera affixed to the input device in the event that the input device is facing the customer. For example, as shown in FIG. 21, the input device includes an iPad2 or other tablet computer. In this example, the iPad2 or other tablet computer is set at an angle to enable an employee to stand or sit and use the device below eye level. In this example, a customer approaching the employee will have his or her face reflected from the tripod mirror into the eye of the tablet computer camera, thereby enabling the employee to take a clear photograph of the customer without greatly tilting or moving the bailment inventory input device.

In some embodiments, the lights may be redirected (i.e. through the use of fiber optics) to an alternate location. In such embodiments, redirecting the lights allows an employee to view the signals at a convenient location rather than a location affixed to the bailment inventory input device.

In some embodiments, the input device may actually comprise two screens, one facing the customer and another facing the attendant, so that each party always has a screen facing them. In some embodiments, the two screens may be provided by using two tablet computer devices. In some embodiments, the two screens have synchronized displays, while in other embodiments the two screens each display at least some data that is not shown on the other screen.

Data Generated by the System

The bailment inventory systems and methods disclosed herein capture quite a bit of data during the bailment inventory process that can be put to beneficial uses. In various embodiments, the bailment inventory systems and methods disclosed herein capture various forms of customer data such as names, phone numbers, pictures and even e-mail addresses. Such customer data comprises valuable information for many locations where the bailment inventory system is used. For example, capturing customer names and/or customer pictures can enable a business to easily gather fairly accurate data on the percentage of males and females that patronize their business, either generally over time and/or during particular days of the week or during particular events or promotions. As an example, consider a bar that promotes a particular event for one evening, such as a drink special, a reduced cover charge, or a performance by a band. If the revenue generated during that evening greatly exceeds the average revenue generated at the bar, the owner may conclude that that activity should be repeated in the future. However, with the additional layer of customer information available from the bailment inventory system of the present disclosure, the owner may determine that a higher-than-normal percentage of young males attended that night. This may encourage the owner to not only repeat the successful event of that evening, but additionally to seek other events that will appeal to young males, in the hopes that the revenue performance will match the prior performance even with a different event featured.

As a further example, having the customers' contact information allows the business to contact those customers to offer promotions. Such promotions could be intended to get the customer to return to the business at a later date, or they could also be sent while the customer is still at the business, in order to encourage them to do something beneficial to the business, such as order more product from the business. For example, drink specials or coupons may be sent by text message or e-mail while the customer is still at a bar. After the customer leaves the bar, messages may be sent, such as further coupons or a schedule of band performance dates, to entice the customer to return to the business at a future date.

The capturing of a photo of the customer, linked to the customer name, allows the business to recognize the customer either during that visit, or as a returning customer. Personalized service such as recognizing a patron's name promotes increased loyalty to the business by its customers.

The data collected by the bailment inventory systems and methods disclosed herein can additionally very accurately determine when a customer is entering and leaving a location. In most bailment situations, such as automobile valet, coat check, ski check, etc., the interaction with the bailment system comprises both the first stop and the last stop made by the customer. The systems and methods disclosed herein can therefore very accurately determine, for an individual customer and/or on average, when the customer arrived, when they left, and how long they spent at the business. The present systems and methods not only capture real-time attendance data, but also whether the customer is a first time user or a returning user of the bailment system. Such data can be extremely useful to a business, as it provides extremely fine-grained information about customers and their behavior patterns.

What is claimed is:

1. A method for control of bailment inventory, comprising the steps of:
   a. receiving a customer identifier for a first time from a customer, the customer identifier received for the first time on any of two or more mobile input devices configured to receive the customer identifier, the two or more input devices configured to directly communicate with each other at least in absence of connection to a server;
   b. receiving from the customer at least one customer item for bailment;
   c. associating the customer identifier with a digital identification device;
   d. storing the bailment item with the digital identification device;
   e. receiving the customer identifier from the customer for a second time, the customer identifier received for the second time capable of being received on any of the two or more input devices, wherein receiving the customer identifier for the first time and the second time can be with same or different of the two or more input devices;
   f. updating of bailment information on the input devices by direct communication between the input device;
   g. sending a signal to the digital identification device (DID) to cause an action that draws attention to the digital identification device; and
   h. retrieving the bailment item.

2. The method of claim 1, wherein the two or more input devices communicate with each other on a local master.

3. The method of claim 2, wherein the input devices communicate in a peer-to-peer network.

4. The method of claim 3, wherein the network is WiFi (wireless Fidelity) direct or Bluetooth.

5. The method of claim 2, wherein the network between the input devices is disabled as a default when a communication with a server through internet is established.

6. The method of claim 1, wherein the input devices are configured to communicate with the server over a communication network, arid the server is configured to update the input devices.

7. The method of claim 1, wherein the step of associating comprises the input device receiving a unique code associated with the DID.

8. The method of claim 1, wherein the step of associating is carried out through coupling at a distance of less than one meter.

9. The method of claim 8, wherein the step of associating further comprises configuring the input devices to communicate with NFC (Near Field Communication).

10. The method of claim 9, wherein the step of associating comprises coupling the input device configured to communicate with the NFC with the DID or an object that is stored with the bailment item and is configured to communicate with the NFC, at a distance of less than one meter.

11. The method of claim 1 wherein the input devices communicate with the DID through radio frequencies.

12. The method of claim 1, wherein the action that draws attention is selected from the group consisting of at least one of: a visual signal, an audio signal, an audiovisual signal, and a vibration.

13. The method of claim 1, wherein the digital identification device transmits a signal that includes a geographic positioning location information.

14. The method of claim 1, wherein the customer identifier is selected from the group consisting of at least one of a phone number, an identification number, a biometric fingerprint, facial recognition, a credit card having a chip, a credit card having a magnetic strip, a barcode, a mobile application-generated barcode, and a mobile payment identification.

15. The method of claim 1, wherein the digital identification device is in the form of a module that is attached to a complementary unit, the complementary unit configured to attach to or hold a bailment item.

16. The method of claim 1, wherein in absence of a connection to a server, communication between the input devices is carried out with a local master or peer-to-peer.

17. The method of claim 1, wherein the method can be carried out in the absence of an internet connection to a server.

18. The method of claim 1, wherein the input device is a tablet computer.

19. The method of claim 1, wherein the bailment item is a coat.

20. The method of claim 1, wherein the bailment item is selected from the group consisting of: a coat, clothing, an automobile, a suitcase, a bag, electronics, a camera, a ski, sports equipment, a computer, a boat, a tablet computer, a mobile phone, a motorcycle, jewelry, gold, money, valuable chattel, toys, headphones, roller skates, and a bicycle.

21. The method of claim 1, wherein the steps b, d, and g are carried out by an attendant.

22. The method of claim 1, wherein the method is carried out by the input device receiving a customer identifier, optionally communicating the customer identifier to a server for a first time, associating by the input device the DID with the customer, communicating by the input device with the server for a second time, and the server updating a database and the input devices.

23. The method of claim 1, wherein the method is carried out by the input device receiving a customer identifier, optionally communicating the customer identifier to a server for a first time, retrieving the DID for the customer, transmitting a radio signal to the DID, closing transaction with the customer, communicating with the server for a second time, and the server updating a database and the input devices.

24. The method of claim 1, wherein the associating step is carried out with NFC and sending the signal to the DID is carried out with RFID.

25. The method of claim 1, wherein the input devices are configured to communicate with a cloud based server with WiFi, and in event of a failure of the WiFi, to communicate to the server through a cellular network, and in event of failure of both the WiFi and the cellular network to operate without the cloud based server.

26. The method of claim 1, wherein the bailment item is a coat and the coat, is placed on a hanger, the hanger configured to communicate with the input devices for associating the customer identifier with a digital identification device.

27. The method of claim 1, wherein the bailment item is a coat, and the coat is placed on a hanger, the DID attached to the hanger, and either of the DID or the hanger configured to communicate with the input devices for associating the customer identifier with a digital identification device.

28. The method of claim 1, further comprising attaching directly or indirectly the DID to the bailment item.

29. A computer-implemented bailment system comprising:
   a. a plurality of digital identification devices (DID) configured to be associated with a customer identifier, and adapted to be stored with a bailment item;
   b. two or more mobile input devices configured to receive the customer identifier and to transmit a signal to the digital identification devices;
   c. one of following configurations when a server/client communication is not established:
     i) a master/slave configuration where a local master updates the input devices,
     ii) a peer-to-peer configuration among the input devices;
   wherein the system is configured to receive the customer identifier at check-in and check-out at any one of the plurality of input devices.

30. The system of claim 29, wherein the master/slave and peer-to-peer communication is disabled when communication is carried out with the server/client configuration.

31. The system of claim 29, wherein the master/slave and peer-to-peer communication is carried out with a network selected from the group consisting of WiFi (wireless Fidelity) direct and Bluetooth.

32. The system of claim 29, wherein the input devices and the digital identification devices are configured to be coupled with each other through communication by NFC, the communication with the NFC resulting in the digital identification devices being associated with the customer identifier.

33. The system of claim 32, wherein the step of associating is carried out through coupling at a distance of less than one meter.

34. The system of claim 29, wherein the input devices are configured to communicate with the digital identification devices through radio frequencies.

35. The system of claim 29, wherein the digital identification devices are configured to emit one or more of a visual signal, an audio signal, an audiovisual signal, and a vibration.

36. The system of claim 29, wherein the digital identification devices are configured to transmit a signal that includes a geographic positioning location information.

37. The system of claim 29, wherein the digital identification device is in form of a module that is attached to a complementary unit, the complementary unit configured to attach to a bailment item.

38. The system of claim 29, wherein the system is configured to function in the absence of a connection to the server.

39. The system of claim 29, wherein the input device is a tablet computer.

40. The system of claim 29, wherein the system is configured to receive the customer identifier, optionally communicating the customer identifier to the server for a first time, associating the DID with the customer, communicating by the input devices with the server for a second time, and updating by the server a database and all of the input devices.

41. The system of claim 29, wherein the system is configured to receive the customer identifier, optionally communicating by the input devices the customer identifier to the server, retrieving the DID for the customer, transmitting a radio signal to the DID, closing transaction by the input devices with the customer, communicating by the input devices with the server, and the server updating a database and all the input devices.

42. The system of claim 29, wherein the input devices are configured to communicate with a cloud based server with WiFi, and in event of a failure of WiFi, to communicate to the server through a cellular network, and in event of failure of both WiFi and the cellular network, to operate without the cloud based server.

43. The method of claim 29, wherein the bailment item is a coat, and the coat is placed on a hanger, the DID attached to the hanger, and either of the DID or the hanger is configured to communicate with the input devices for associating the customer identifier with a digital identification device.

44. The method of claim 29, wherein the system displays a number on the DID after activation of the DID.

\* \* \* \* \*